(12) United States Patent
Lee et al.

(10) Patent No.: US 11,531,378 B2
(45) Date of Patent: Dec. 20, 2022

(54) ELECTRONIC DEVICE INCLUDING FLEXIBLE DISPLAY AND HINGE STRUCTURE

(71) Applicant: Samsung Electronics Co., Ltd., Suwon-si (KR)

(72) Inventors: Seo Lee, Suwon-si (KR); Sangchul Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/285,667

(22) PCT Filed: Nov. 1, 2019

(86) PCT No.: PCT/KR2019/014737
§ 371 (c)(1),
(2) Date: Apr. 15, 2021

(87) PCT Pub. No.: WO2020/122417
PCT Pub. Date: Jun. 18, 2020

(65) Prior Publication Data
US 2021/0397223 A1    Dec. 23, 2021

(30) Foreign Application Priority Data
Dec. 14, 2018   (KR) .................. 10-2018-0162130

(51) Int. Cl.
*G06F 1/16* (2006.01)
(52) U.S. Cl.
CPC .......... *G06F 1/1652* (2013.01); *G06F 1/1641* (2013.01); *G06F 1/1681* (2013.01)
(58) Field of Classification Search
CPC .... G06F 1/1652; G06F 1/1641; G06F 1/1681; G06F 1/1684; G06F 2203/04102
See application file for complete search history.

(56) References Cited

U.S. PATENT DOCUMENTS 9,348,450 B1 * 5/2016 Kim ...................... G06F 1/1616
9,535,452 B2 * 1/2017 Ahn ...................... G06F 1/1615
(Continued)

FOREIGN PATENT DOCUMENTS

| KR | 10-2002-0004350 A | 1/2002 |
| KR | 10-2002-0029698 A | 4/2002 |

(Continued)

*Primary Examiner* — Rockshana D Chowdhury
(74) *Attorney, Agent, or Firm* — Jefferson IP Law, LLP

(57) ABSTRACT

Various embodiments disclosed in the present document relates to a foldable electronic device. Various embodiments may provide an electronic device including: a first housing structure including a first surface, a second surface facing in a direction opposite to the first surface, and a first side member surrounding at least a portion of a space between the first surface and the second surface, wherein the first side member includes a first rotational support portion at an edge thereof when viewed from above the first surface; a second housing structure including a third surface, a fourth surface facing in a direction opposite to the third surface, and a second side member surrounding at least a portion of a space between the third surface and the fourth surface, wherein the second side member includes a second rotational support portion facing the first rotational support portion at an edge thereof when viewed from above the third surface; a flexible display including a first portion disposed on the first surface, a second portion disposed on the third surface, and a third portion disposed between the first portion and the second portion and having a shape variable depending on an angle between the first surface and the third surface; and a hinge structure which is connected to each of the first rotational support portion and the second rotational support portion, wherein the hinge structure is capable of forming a recess for accommodating at least a portion of the third portion when the angle between the first surface and the third surface is equal to or less than a designated first angle.

13 Claims, 17 Drawing Sheets

(56) References Cited

U.S. PATENT DOCUMENTS

| | | | |
|---|---|---|---|
| 9,910,458 B2* | 3/2018 | Watanabe | H04M 1/0268 |
| 10,310,551 B2* | 6/2019 | Bae | G06F 1/1616 |
| 10,761,573 B2* | 9/2020 | Hsu | G06F 1/1681 |
| 10,921,863 B2* | 2/2021 | Gault | H04M 1/022 |
| 11,016,530 B2* | 5/2021 | Watamura | G06F 1/1652 |
| 2013/0010405 A1* | 1/2013 | Rothkopf | H05K 5/0017 |
| | | | 361/679.01 |
| 2013/0021762 A1 | 1/2013 | Van Dijk et al. | |
| 2014/0328041 A1 | 11/2014 | Rothkopf et al. | |
| 2015/0233162 A1 | 8/2015 | Lee et al. | |
| 2015/0241925 A1 | 8/2015 | Seo et al. | |
| 2016/0295709 A1 | 10/2016 | Ahn | |
| 2018/0011515 A1 | 1/2018 | Yoo et al. | |
| 2018/0292860 A1* | 10/2018 | Siddiqui | H04M 1/0216 |

FOREIGN PATENT DOCUMENTS

| | | |
|---|---|---|
| KR | 10-2002-0039891 A | 5/2002 |
| KR | 10-2015-0096946 A | 8/2015 |
| KR | 10-2016-0118407 A | 10/2016 |
| KR | 10-2018-0005476 A | 1/2018 |
| KR | 10-2018-0030433 A | 3/2018 |
| KR | 10-2018-0030435 A | 3/2018 |
| KR | 10-1861348 B1 | 6/2018 |
| KR | 10-1875855 B1 | 7/2018 |

\* cited by examiner

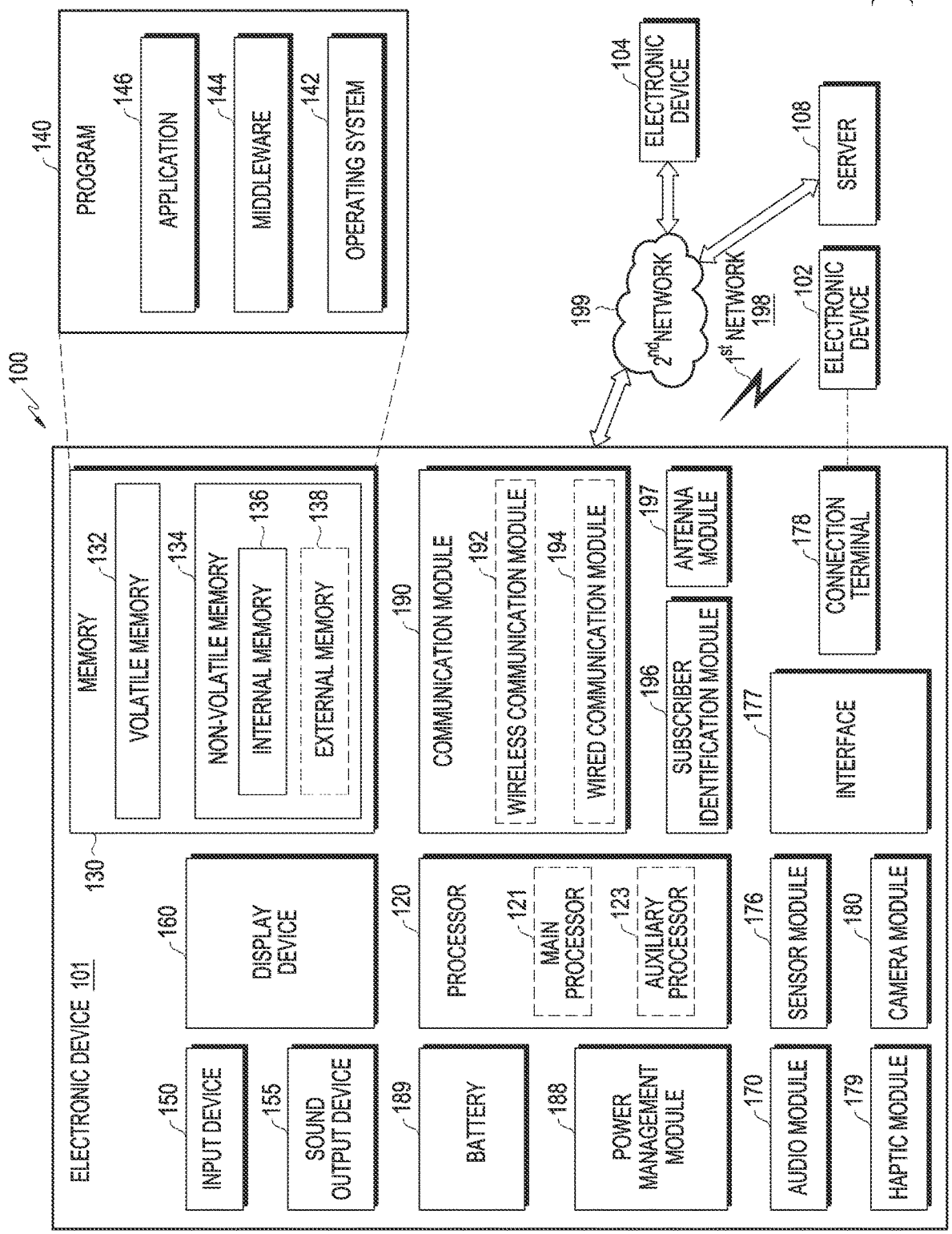

ELECTRONIC DEVICE INCLUDING FLEXIBLE DISPLAY AND HINGE STRUCTURE

CROSS-REFERENCE TO RELATED APPLICATION(S)

This application is a U.S. National Stage application under 35 U.S.C. § 371 of an International application number PCT/KR2019/014737, filed on Nov. 1, 2019, which is based on and claimed priority of a Korean patent application number 10-2018-0162130, filed on Dec. 14, 2018, in the Korean Intellectual Property Office, the disclosure of which is incorporated by reference herein in its entirety.

BACKGROUND

1. Field

Various embodiments disclosed herein relate to a foldable electronic device.

2. Description of the Related Art

Typically, an electronic device means a device that performs a specific function according to a program incorporated therein, such as an electronic scheduler, a portable multimedia reproducer, a mobile communication terminal, a tablet PC, an image/sound device, a desktop/laptop PC, or a vehicle navigation system, as well as a home appliance. The above-mentioned electronic devices may output, for example, information stored therein as sound or an image. As the integration degree of electronic devices has increased and super-high speed and large-capacity wireless communication have become popular, various functions have recently been provided in a single mobile communication terminal. For example, various functions, such as an entertainment function (e.g., a game function), a multimedia function (e.g., a music/video reproducing function), a communication and security function for mobile banking or the like, a schedule management function, and an e-wallet function, in addition to a communication function, have come to be integrated in a single electronic device. In addition, an electronic device may include one or more imaging modules (e.g., cameras), and may directly record and store an external image or video using the imaging module.

In general, a flexible display panel is a display panel that is capable of being bent with a predetermined curvature. In such a flexible display panel, a plastic substrate is used rather than a generally used glass substrate. Thus, in order to prevent damage to the substrate, a conventional manufacturing process is not used, but a low-temperature manufacturing process is mainly used. Such a flexible display panel is manufactured as a touch screen that enables, for example, capacitive or pressure-sensitive touch input thereon so as to receive a user's command in a touch manner.

Meanwhile, a conventional portable foldable display device includes a flexible display panel on which touch input is capable of being performed as described above. In such a conventional foldable display device, a predetermined accommodation space in which a folded portion of the flexible display panel is capable of being bent in a curvature shape is formed at a portion at which a pair of bodies supporting the flexible display panel are hinged to each other.

SUMMARY

In a general conventional foldable display device, when a pair of bodies of the flexible display are unfolded, the central portion (the folded part) of the flexible display panel is located above the accommodation space, and thus the rear surface of the flexible display panel may not be supported at all.

Accordingly, when a user touches the central portion of the flexible display panel, the flexible display panel is movable while being pushed a predetermined distance in the direction in which the flexible display panel is touched. As a result, it is difficult to perform predetermined touch input in the central portion of the flexible display panel, so there is a problem in that usability is deteriorated.

In order to solve the problems described above, the disclosure is capable of providing a hinge device that stably supports a flexible display panel without an area in which the flexible display panel is pushed by a user's touch operation by fully supporting the flexible display panel when a foldable display device is unfolded, and a foldable display device including the hinge device.

Various embodiments disclosed herein are capable of providing an electronic device including: a first housing structure including a first surface, a second surface facing in a direction opposite to the first surface, and a first side member surrounding at least a portion of a space between the first surface and the second surface, wherein the first side member includes a first rotational support portion at an edge thereof when viewed from above the first surface; a second housing structure including a third surface, a fourth surface facing in a direction opposite to the third surface, and a second side member surrounding at least a portion of a space between the third surface and the fourth surface, wherein the second side member includes a second rotational support portion facing the first rotational support portion at an edge thereof when viewed from above the third surface; a flexible display including a first portion disposed on the first surface, a second portion disposed on the third surface, and a third portion disposed between the first portion and the second portion and having a shape variable depending on an angle between the first surface and the third surface; and a hinge structure connected to each of the first rotational support portion and the second rotational support portion, wherein the hinge structure is capable of forming a recess for accommodating at least a portion of the third portion when the angle between the first surface and the third surface is equal to or less than a predetermined first angle.

Various embodiments disclosed herein are capable of providing an electronic device including: a first housing structure including a first surface, a second surface facing in a direction opposite to the first surface, and a first side member surrounding at least a portion of a space between the first surface and the second surface, wherein the first side member includes a first rotational support portion at an edge thereof when viewed from above the first surface; a second housing structure including a third surface, a fourth surface facing in a direction opposite to the third surface, and a second side member surrounding at least a portion of a space between the third surface and the fourth surface, wherein the second side member includes a second rotational support portion facing the first rotational support portion at an edge thereof when viewed from above the third surface; a flexible display including a first portion disposed on the first surface, a second portion disposed on the third surface, and a third portion disposed between the first portion and the second portion and having a shape variable depending on an angle between the first surface and the third surface; and a hinge structure including a first connecting member connected to the first rotational support portion, a second connecting member connected to the second rotational support portion, and a cover member. In the hinge structure, the size of a recess for accommodating at least part of the third portion is adjusted according to the movement of the first connecting member and the second connecting member, when the angle between the first surface and the third surface is equal to or less than a predetermined first angle, the first connecting member and the second connecting member support the third portion of the flexible display while maintaining the recess constant in the state of being fixed inside the hinge structure, and when the angle between the first surface and the third surface exceeds the predetermined first angle, the first connecting member and the second connecting member support the third portion of the flexible display while moving together with the first housing structure and the second housing structure, respectively, inside the hinge structure.

According to various embodiments disclosed herein, it is possible to provide a structure capable of reducing stress applied to a flexible display of a foldable phone and capable of effectively maintaining the flatness of the flexible display when the electronic device is unfolded.

BRIEF DESCRIPTION OF THE DRAWINGS

FIG. 1 is a block diagram of an electronic device according to various embodiments in a network environment;

DETAILED DESCRIPTION

Figure 2A:
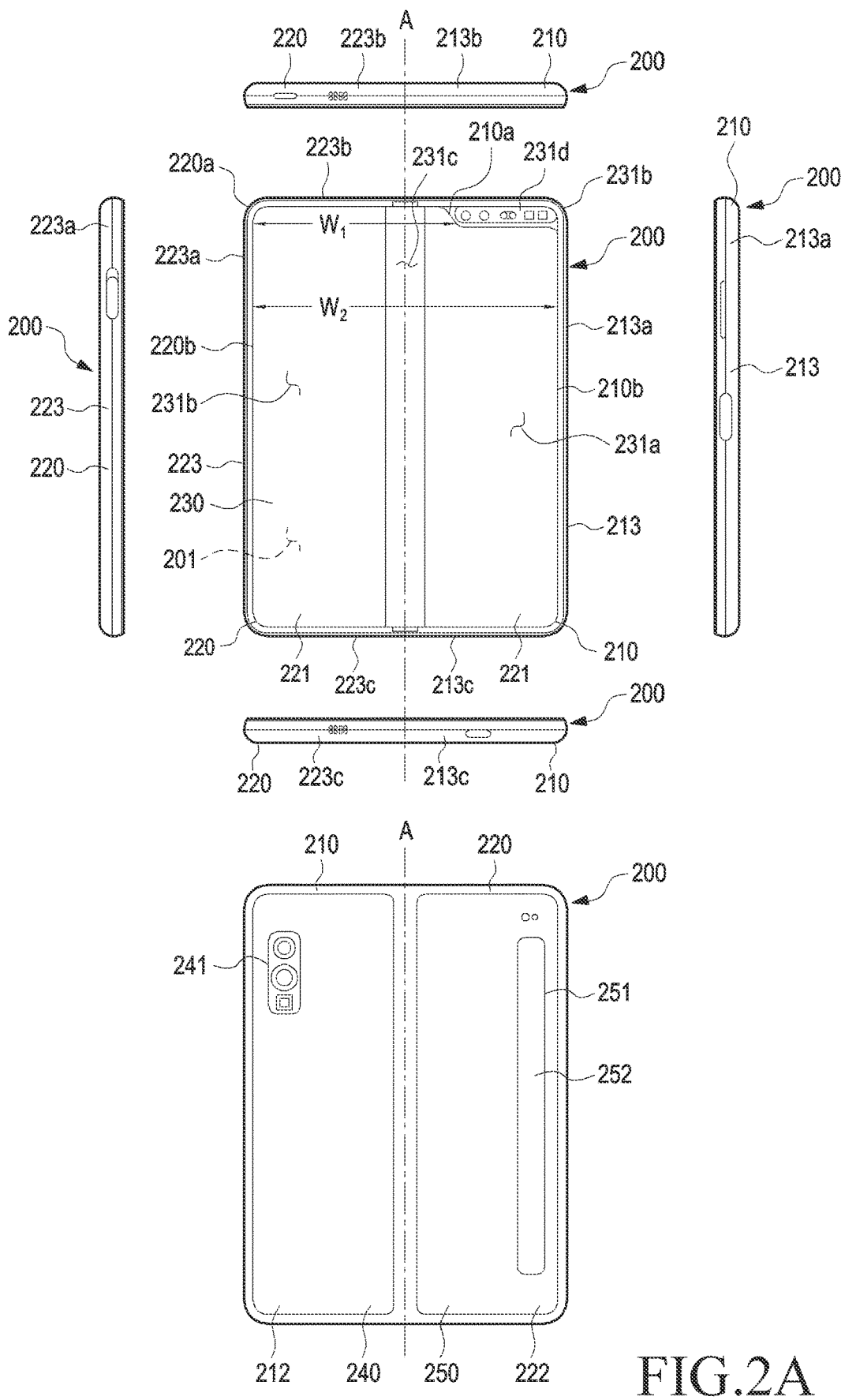
FIG. 2A is a view illustrating the unfolded state of an electronic device according to various embodiments.

FIG. 1 is a block diagram illustrating an electronic device 101 in a network environment 100, according to various embodiments.

Referring to FIG. 1, the electronic device 101 in the network environment 100 may communicate with an electronic device 102 via a first network 198 (e.g., a short-range wireless communication network), or may communicate with an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, or an antenna module 197. In some embodiments, at least one of these components (e.g., the display device 160 or the camera module 180) may be eliminated from the electronic device 101 or one or more other components may be added to the electronic device 101. In some embodiments, some of these components may be implemented as a single integrated circuit. For example, the sensor module 176 (e.g., a fingerprint sensor, an iris sensor, or an illuminance sensor) may be implemented in the state of being embedded in the display device 160 (e.g., a display).

The processor 120 may control at least one other component (e.g., a hardware or software component) of the electronic device 101, which is connected to the processor 120, and may perform various data processing or arithmetic operations by executing, for example, software (e.g., a program 140). According to an embodiment, as at least a part of data processing or calculation, the processor 120 may load instructions or data received from another component (e.g., the sensor module 176 or the communication module 190) in volatile memory 132, and may process instructions or data stored in the volatile memory 132 so as to store the resulting data in nonvolatile memory 134. According to an embodiment, the processor 120 may include a main processor 121 (e.g., a central processing unit or an application processor), and an auxiliary processor 123, which operates independently from or together with the main processor 121 (e.g., a graphic processing device, an image signal processor, a sensor hub processor, or a communication processor). Additionally or alternatively, the auxiliary processor 123 may use less power than the main processor 121, or may be set to be specific to a specified function. The auxiliary processor 123 may be implemented separately from, or as part of, the main processor 121.

The auxiliary processor 123 may control at least some functions or states associated with at least one of the components of the electronic device 101 (e.g., the display device 160, the sensor module 176, or the communication module 190), on behalf of the main processor 121, for example, while the main processor 121 is in an inactive (e.g., sleep) state, or together with the main processor 121 while the main processor 121 is in an active (e.g., application execution) state. According to an embodiment, the auxiliary processor 123 (e.g., an image signal processor or a communication processor) may be implemented as some of other functionally related components (e.g., the camera module 180 or the communication module 190).

The memory 130 may store various data to be used by at least one component of electronic device 101 (e.g., the processor 120 or the sensor module 176). The data may include, for example, input data or output data for software (e.g., the program 140) and instructions associated therewith. The memory 130 may include, for example, volatile memory 132 or nonvolatile memory 134.

The program 140 may be stored in the memory 130 as software, and may include, for example, an operating system 142, middleware 144, or application 146.

The input device 150 may receive instructions or data for use in a component (e.g., the processor 120) of the electronic device 101 from the outside (e.g., the user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes such as multimedia playback or record playback, and the receiver may be used for receiving incoming calls. According to an embodiment, the receiver may be implemented separately from, or as part of, the speaker.

The display device 160 may visually provide information to the outside (e.g., the user) of the electronic device 101. The display device 160 may include, for example, a display, a hologram device, or a projector and control circuitry for controlling the device. According to an embodiment, the display device 160 may include touch circuitry configured to sense a touch, or a sensor circuit (e.g., a pressure sensor) configured to measure the strength of a force generated by the touch.

The audio module 170 may convert sound into an electrical signal, or vice versa. According to an embodiment, the audio module 170 may acquire sound through the input device 150 or may output sound through the sound output device 155 or an external electronic device (e.g., the electronic device 102 (e.g., a speaker or headphone)) directly or wirelessly connected with the electronic device 101.

The sensor module 176 may sense an operating state (e.g., power or temperature) of the electronic device 101 or an external environmental state (e.g., the user state), and may generate an electrical signal or a data value corresponding to the sensed state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an IR (infrared) sensor, a biometric sensor, a temperature sensor, a humidity sensor, or an illuminance sensor.

The interface 177 may support one or more predetermined protocols that may be used by the electronic device 101 so as to be directly or wirelessly connected to an external electronic device (e.g., the electronic device 102). According to an embodiment, the interface 177 may include, for example, a High Definition Multimedia Interface (HDMI), a Universal Serial Bus (USB) interface, an SD card interface, or an audio interface.

A connection terminal 178 may include a connector through which the electronic device 101 may be physically connected to an external electronic device (e.g., the electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., vibration or motion) or an electrical stimulus that may be perceived by the user through a tactile or kinesthetic sense. According to an embodiment, the haptic module 179 may include, for example, a motor, a piezoelectric element, or an electrical stimulation device.

The camera module 180 is capable of capturing a still image and a video image. According to an embodiment, the camera module 180 may include one or more lenses, image sensors, image signal processors, or flashes.

The power management module 188 may manage the power to be supplied to the electronic device 101. According to an embodiment, the power management module 188 may be implemented as at least a portion of, for example, a Power Management Integrated Circuit (PMIC).

The battery 189 is capable of supplying power to at least one component of the electronic device 101. According to an embodiment, the battery 189 may include, for example, a non-rechargeable primary battery, a rechargeable secondary battery, or a fuel cell.

The communication module 190 may establish a direct (e.g., wired) communication channel or a wireless communication channel between the electronic device 101 and an external electronic device (e.g., the electronic device 102, the electronic device 104, or the server 108), and may support communication via the established communication channel. The communication module 190 may include one or more communication processors, which are operated independently from a processor 120 (e.g., an application processor) and support direct (e.g., wired) communication or wireless communication. According to an embodiment, the communication module 190 may include a wireless communication module 192 (e.g., a cellular communication module, a short range wireless communication module, or a Global Navigation Satellite System (GNSS) communication module) or a wired communication module 194 (e.g., a Local Area Network (LAN) communication module or a power line communication module). A corresponding one of these communication modules may communicate with an external electronic device via a first network 198 (e.g., a short range communication network such as Bluetooth, Wi-Fi direct, or infrared data association (IrDA)) or a second network 199 (e.g., a cellular network, the Internet, or a computer network (e.g., a telecommunication network such as a LAN or a WAN)). These various types of communication modules may be integrated into one component (e.g., a single chip) or may be implemented as a plurality of components (e.g., a plurality of chips) that are separated from each other. The wireless communication module 192 may identify or authenticate the electronic device 101 in a communication network such as the first network 198 or the second network 199 using subscriber information (e.g., international mobile subscriber identity (IMSI)) stored in a subscriber identification module 196.

The antenna module 197 may transmit/receive signals or power to/from the outside (e.g., an external electronic device). According to an embodiment, the antenna module may include one antenna including a radiator made of a conductor or a conductive pattern formed on a substrate (e.g., a PCB). According to an embodiment, the antenna module 197 may include a plurality of antennas. In such a case, at least one antenna, which is suitable for a communication scheme used in a communication network, such as the first network 198 or the second network 199, may be selected by, for example, the communication module 190 from the plurality of antennas. Signals or power may be transmitted or received between the communication module 190 and the external electronic device via the at least one selected antenna. According to some embodiments, other components (e.g., an RFIC) may be further formed as part of the antenna module 197 in addition to the radiator.

At least some of the components described above may be connected to each other via a communication scheme between peripheral devices (e.g., a bus, a general purpose input and output (GPIO), a serial peripheral interface (SPI), or a mobile industry processor interface (MIPI)), and may exchange signals (e.g., commands or data) therebetween.

According to an embodiment, the instructions or data may be transmitted or received between the electronic device 101 and the external electronic device 104 via the server 108 connected to the second network 199. Each of the electronic devices 102 and 104 may be of a type, which is the same as or different from the electronic device 101. According to an embodiment, all or some of the operations executed in the electronic device 101 may be executed in one or more of the external electronic devices 102, 104, and 108. For example, when the electronic device 101 is to perform a function or service automatically, or in response to a request from a user or other device, the electronic device 101 may request that one or more external electronic devices perform the function or at least part of the service, in place of or in addition to performing the function or service by itself. The one or more external electronic devices that receive the request may execute at least part of the requested function or service, or an additional function or service associated with the request, and may deliver the result of the execution to the electronic device 101. As at least part of the response to the request, the electronic device 101 may provide the result as it is or additionally process and provide the result. For this purpose, for example, a cloud computing technology, a distributed computing technology, or a client-server computing technology may be used.

Figure 2B:
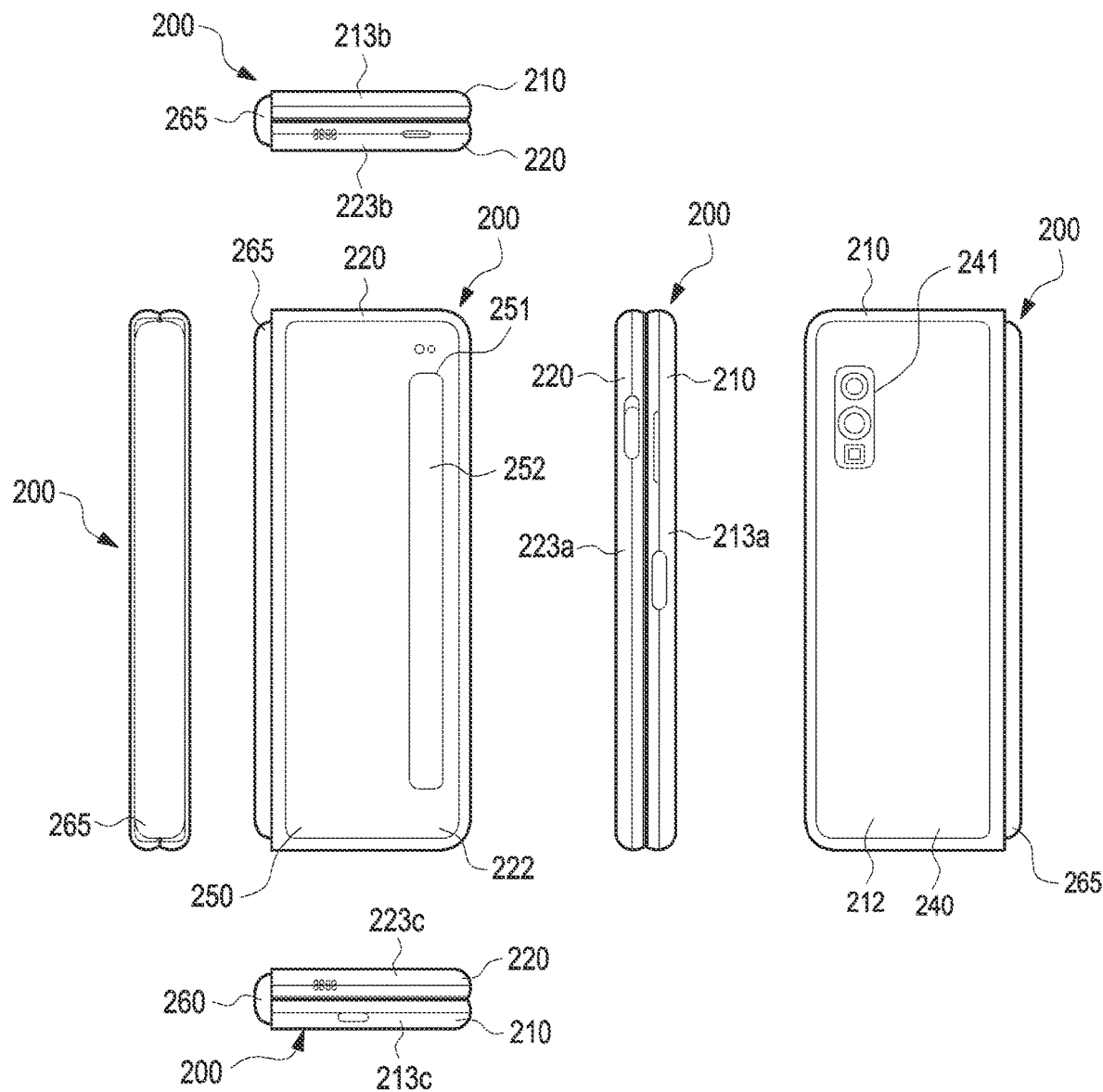
FIG. 2B is a view illustrating the folded state of the electronic device of FIG. 2A according to various embodiments of the disclosure.

FIG. 2A is a view illustrating the unfolded state of an electronic device 200 (e.g., the electronic device 101 in FIG. 1) according to various embodiments of the disclosure. FIG. 2B is a view illustrating the folded state of the electronic device 200 of FIG. 2A according to various embodiments of the disclosure.

The electronic device 200 of FIGS. 2A and 2B may be at least partially similar to the electronic device 101 of FIG. 1, or may include other embodiments of the electronic device.

Referring to FIG. 2A, the electronic device 200 may include a pair of housing structures 210 and 220 rotatably coupled to each other via a hinge structure (e.g., the hinge structure 264 in FIG. 3) so as to be folded with respect to each other, a hinge cover 265 that covers the foldable portions of the pair of housing structures 210 and 220, and a display 230 (e.g., a flexible display or a foldable display) (e.g., 160 in FIG. 1) disposed in a space formed by the pair of housing structures 210 and 220. Herein, the surface on which the display 230 is disposed may be defined as the front surface of the electronic device 200, and the surface opposite to the front surface may be defined as the rear surface of the electronic device 200. In addition, the surface surrounding the space between the front surface and the rear surface may be defined as the side surface of the electronic device 200.

In an embodiment, the pair of housing structures 210 and 220 may include a first housing structure 210 including a sensor arrangement area 231d, a second housing structure 220, a first rear cover 240, and a second rear cover 250. The pair of housing structures 210 and 220 of the electronic device 200 are not limited to the shape and assembly illustrated in FIGS. 2A and 2B, but may be implemented by other shapes or other combinations and/or assemblies of components. For example, in another embodiment, the first housing structure 210 and the first rear cover 240 may be integrally formed, and the second housing structure 220 and the second rear cover 250 may be integrally formed.

According to an embodiment, the first housing structure 210 and the second housing structure 220 may be disposed on opposite sides about a folding axis (the axis A), and may have generally symmetrical shapes with respect to the folding axis (the axis A). According to an embodiment, the angle or distance between the first housing structure 210 and the second housing structure 220 may vary depending on whether the electronic device 200 is in the unfolded state (the flat state), in the folded state (the closed state), or in the intermediate state. According to an embodiment, unlike the second housing structure 220, the first housing structure 210 may further include a sensor arrangement area 231d in which various sensors are arranged. However, the first housing structure 210 and the second housing structure 220 may have mutually symmetrical shapes in other areas. In another embodiment, the sensor arrangement area 231d may be further disposed in or replaced with at least a partial area of the second housing structure 220. In still another embodiment, the sensor arrangement area 231d may be provided so as not to be exposed to the exterior as illustrated in FIGS. 4A to 14 to be described later.

In an embodiment, in the unfolded state of the electronic device 200, the first housing structure 210 may include a first surface 211 connected to a hinge structure (e.g., the hinge structure 264 in FIG. 3) and arranged to face the front side of the electronic device 200, a second surface 212 facing in a direction opposite to the first surface 211, and a first side member 213 surrounding at least part of the space between the first surface 211 and the second surface 212. In an embodiment, the first side member 213 may include a first side surface 213a arranged parallel to the folding axis (the axis A), a second side surface 213b extending from one end of the first side surface 213a in a direction perpendicular to the folding axis (the axis A), and a third side surface 213c extending from the other end of the first side surface 213a in a direction perpendicular to the folding axis (the axis A).

In an embodiment, in the unfolded state of the electronic device 200, the second housing structure 220 may include a third surface 221 connected to the hinge structure (e.g., the hinge structure 264 in FIG. 3) and arranged to face the front side of the electronic device 200, a fourth surface 222 facing in a direction opposite to the third surface 221, and a second side member 223 surrounding at least part of the space between the third surface 221 and the fourth surface 222. In an embodiment, the second side member 223 may include a fourth side surface 223a arranged parallel to the folding axis (the axis A), a fifth side surface 223b extending from one end of the fourth side surface 223a in a direction perpendicular to the folding axis (the axis A), and a sixth side surface 223c extending from the other end of the fourth side surface 223a in a direction perpendicular to the folding axis (the axis A). In an embodiment, in the folded state, the third surface 221 may face the first surface 211.

In an embodiment, the electronic device 200 may include a recess 201 configured to accommodate the display 230 through structural shape combination of the first housing structure 210 and the second housing structure 220. The recess 201 may have substantially the same size (or volume) as the display 230. In an embodiment, due to the sensor arrangement area 231d, the recess 201 may have two or more different widths in a direction perpendicular to the folding axis (the axis A). For example, the recess 201 may have a first width W1 between a first portion 220a of the second housing structure 220, which is parallel to the folding axis (the axis A), and a first portion 210a of the first housing structure 210, which is provided at an edge of the sensor arrangement area 231d, and a second width W2 defined by a second portion 220b of the second housing structure 210 and a second portion 210b of the first housing structure 210, which does not correspond to the sensor arrangement area 213d and is parallel to the folding axis (the axis A). In this case, the second width W2 may be longer than the first width W1. For example, the recess 201 may have the first width W1 from the first portion 210a of the first housing structure 210 to the first portion 220a of the second housing structure 220, which are asymmetric to each other, and the second width W2 from the second portion 210b of the first housing structure 210 to the second portion 220b of the second housing structure 220, which are symmetric to each other. In an embodiment, the first portion 210a and the second portion 210b of the first housing structure 210 may have different distances from the folding axis (the axis A). The widths of the recess 201 are not limited to the illustrated example. In various embodiments, the recess 201 may have two or more different widths due to the shape of the sensor arrangement area 213d or the asymmetric portions of the first housing structure 210 and the second housing structure 220.

In an embodiment, at least part of the first housing structure 210 and the second housing structure 220 may be formed of a metal material or a non-metal material having the rigidity of a level selected in order to support the display 230.

In an embodiment, the sensor arrangement area 231d may include a predetermined area adjacent to one corner of the first housing structure 210. However, the arrangement, shape, and size of the sensor arrangement area 231d is not limited to the illustrated example. For example, in another embodiment, the sensor arrangement area 231d may be provided at another corner of the first housing structure 210 or in any area between the upper and lower end corners. In another embodiment, the sensor arrangement area 231d may be disposed in at least a partial area of the second housing structure. In another embodiment, the sensor arrangement area 231d may be disposed to extend over the first housing structure 210 and the second housing structure 220. In an embodiment, the electronic device 200 may include components for performing various functions. The components may be exposed on the front surface of the electronic device 200 through the sensor arrangement area 231d or through one or more openings provided in the sensor arrangement area 231d. In various embodiments, the components may include, for example, at least one of a front camera device, a receiver, a proximity sensor, an illuminance sensor, an iris recognition sensor, an ultrasonic sensor, or an indicator.

In an embodiment, the first rear cover 240, the second rear cover 250, the first housing structure 210, and the second housing structure 220 may provide, through a mutually coupled structure, a space in which various components (e.g., a printed circuit board, an antenna module, a sensor module, or a battery) of the electronic device 200 may be arranged. According to an embodiment, one or more components may be disposed or visually exposed on the rear surface of the electronic device 200. For example, one or more components or sensors may be visually exposed through a first rear area 241 of the first rear cover 240. In various embodiments, the sensors may include a proximity sensor, a rear camera device, and/or a flash. In another embodiment, at least part of the sub-display 252 may be visually exposed through a second rear area 251 of the second rear cover 250.

The display 200 may be disposed in a space defined by the pair of housing structures 210 and 220. For example, the display 200 may be seated in the recess (e.g., the recess 201 in FIG. 2A) defined by the pair of housing structures 210 and 220, and may be disposed to occupy substantially the majority of the front surface of the electronic device 200. Accordingly, the front surface of the electronic device 200 may include the display 230, as well as a partial area (e.g., a peripheral area) of the first housing structure 210 and a partial area (e.g., a peripheral area) of the second housing structure 220, which are adjacent to the display 230. In an embodiment, the rear surface of the electronic device 200 may include the first rear cover 240, a partial area (e.g., a peripheral area) of the first housing structure 210 adjacent to the first rear cover 240, the second rear cover 250, and a partial area (e.g., a peripheral area) of the second housing structure 220 adjacent to the second rear cover 250.

According to an embodiment, the display 230 may mean a display in which at least a partial area is deformable into a planar face or a curved face. In an embodiment, the display 230 may include a folding area 231c, a first area 231a disposed on one side of the folding area 231c (e.g., the right area of the folding area 231c), and a second area 231b disposed on the other side of the folding area 231c (e.g., the left area of the folding area 231c). For example, the first area 231a may be disposed in the first surface 211 of the first housing structure 210, and the second area 231b may be disposed in the third surface 221 of the second housing structure 220. In an embodiment, the area division of the display 230 is illustrative, and the display 230 may be divided into multiple areas (e.g., four or more areas or two areas) depending on the structure or functions thereof. For example, in the embodiment illustrated in FIG. 2A, the areas of the display 230 may be divided by the folding area 231c or the folding axis (the axis A) extending parallel to the Y axis. However, in another embodiment, the areas of the display 230 may be divided based on another folding area (e.g., a folding area parallel to the X axis) or another folding axis (e.g., a folding axis parallel to the X axis). The above-described division of the area related to the display is merely physical division based on the pair of housing structures 210 and 220 and the hinge structure (e.g., the hinge structure 264 in FIG. 3). It is possible to provide an integrated screen through the entire area of the display. Of course, it is also possible to divide a screen and to display the divided screens over the entire area of the display. According to an embodiment, the first area 231a and the second area 231b may have generally symmetrical shapes about the folding area 231c. However, unlike the second area 231b, the first area 231a may include a cut notch area (e.g., the notch area 233 in FIG. 3) depending on the existence of the sensor arrangement area 231d, but the first area 231a may have a shape symmetrical to the second area 231b in the area other than the notch area. In other words, the first area 231a and the second area 231b may include mutually symmetrical portions and mutually asymmetrical portions.

Figure 3:
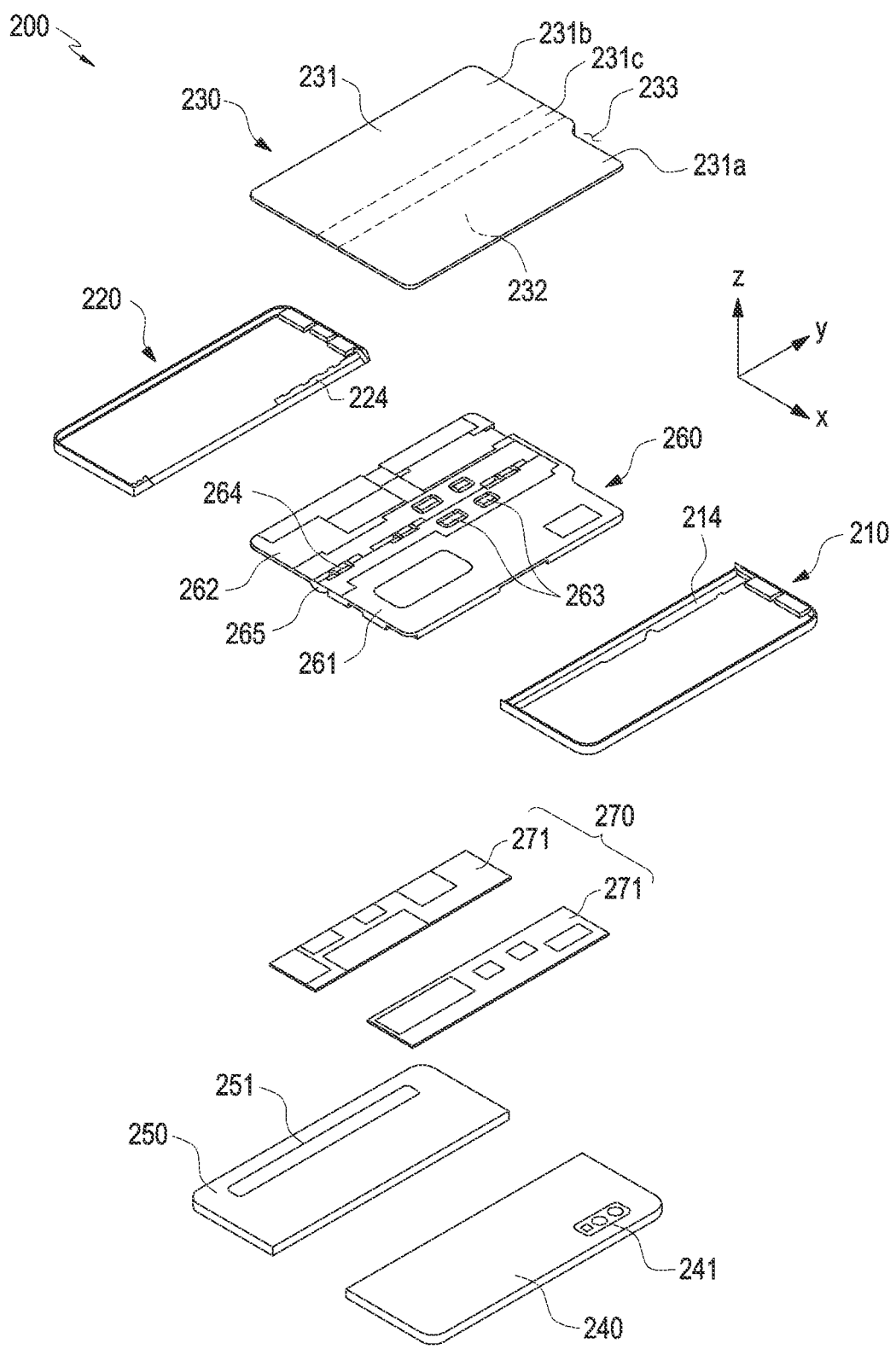
FIG. 3 is an exploded perspective view illustrating an electronic device according to various embodiments of the disclosure.

Referring to FIG. 2B, the hinge cover 265 may be disposed between the first housing structure 210 and the second housing structure 220 so as to cover internal components (e.g., the hinge structure 264 in FIG. 3). In an embodiment, the hinge cover 265 may be hidden by a portion of each of the first and second housing structures 210 and 220 or may be exposed to the outside depending on the operating state of the electronic device 200 (the unfolded state (the flat state) or the folded state).

For example, as illustrated in FIG. 2A, when the electronic device 200 is in the unfolded state, the hinge cover 265 may not be exposed by being hidden by the first housing structure 210 and the second housing structure 220. For example, as illustrated in FIG. 2B, when the electronic device 200 is in the folded state (e.g., the completely folded state), the hinge cover 265 may be exposed to the outside between the first housing structure 210 and the second housing structure 220. For example, when the first housing structure 210 and the second housing structure 220 are in the intermediate state in which the first housing structure 210 and the second housing structure 220 are folded with a certain angle therebetween, the hinge cover 265 may be partially exposed to the outside between the first housing structure 210 and the second housing structure 220. In this case, the exposed area may be smaller than that in the completely folded state. In an embodiment, the hinge cover 265 may include a curved surface.

Hereinafter, the operations of the first housing structure 210 and the second housing structure 220 and respective areas of the display 230 according to the operating states (e.g., the unfolded state (the flat state) and the folded state) of the electronic device 200 will be described.

In an embodiment, when the electronic device 200 is in the unfolded state (flat state) (e.g., the state in FIG. 2A), the first housing structure 210 and the second housing structure 220 may form an angle of 180 degrees therebetween, and the first area 231a and the second area 231b of the display may be disposed so as to face the same direction. In addition, the folding area 231c may form the same plane as the first area 231a and the second area 232b.

In an embodiment, when the electronic device 200 is in the folded state (e.g., the state in FIG. 2B), the first housing structure 210 and the second housing structure 220 may be disposed so as to face each other. The first area 231a and the second area 231b of the display 230 may face each other while forming a narrow angle (e.g., an angle between 0 and 10 degrees) relative to each other. At least part of the folding area 231c may have a curved surface having a predetermined curvature.

FIG. 3 is an exploded perspective view illustrating the electronic device 200 according to various embodiments of the disclosure.

Referring to FIG. 3, in an embodiment, the electronic device 200 may include a display 230, a support member assembly 260, at least one printed circuit board 270, a first housing structure 210, a second housing structure 220, a first rear cover 240, and a second rear cover 250. Herein, the display 230 may be referred to as a display module or a display assembly.

The display 230 may include a display panel 231 (e.g., a flexible display panel), and at least one plate 232 or layer on which the display panel 231 is seated. In an embodiment, the plate 232 may be disposed between the display panel 231 and the support member assembly 260. The display panel 231 may be disposed on at least part of one surface (e.g., the surface in the Z direction in FIG. 3) of the plate 232. The plate 232 may have a shape corresponding to that of the display panel 231. For example, a partial area of the plate 232 may have a shape corresponding to that of the notch area 233 in the display panel 231.

The support member assembly 260 may include a first support member 261, a second support member 262, a hinge structure 264 disposed between the first support member 261 and the second support member 262, a hinge cover 265 configured to cover the hinge structure 264 when the hinge structure 264 is viewed from the outside, and a wiring member 263 (e.g., a flexible printed circuit board (FPCB)) extending across the first and second support members 261 and 262.

In an embodiment, the support member assembly 260 may be disposed between the plate 232 and the at least one printed circuit board 270. For example, the first support member 261 may be disposed between the first area 231a of the display 230 and a first printed circuit board 271. The second support member 262 may be disposed between the second area 231b of the display 230 and a second printed circuit board 272.

In an embodiment, at least part of the wiring member 263 and the hinge structure 264 may be disposed inside the support member assembly 260. The wiring member 263 may be disposed in a direction across the first support member 261 and the second support member 262 (e.g., the X-axis direction). The wiring member 263 may be disposed in a direction (e.g., the X-axis direction) perpendicular to the folding axis (e.g., the Y axis or the folding axis A in FIG. 1) of the folding area 231c.

As described above, the at least one printed circuit board 270 may include a first printed circuit board 271 disposed on the first support member 261 side and a second printed circuit board 272 disposed on the second support member 262 side. The first printed circuit board 271 and the second printed circuit board 272 may be disposed inside a space defined by the support member assembly 260, the first housing structure 210, the second housing structure 220, the first rear cover 240, and the second rear cover 250. Components for implementing various functions of the electronic device 200 may be mounted on the first printed circuit board 271 and the second printed circuit board 272.

In an embodiment, the first housing structure 210 may include a first rotational support surface 214, and the second housing structure 520 may include a second rotational support surface 224, which corresponds to the first rotational support surface 214. The first rotational support surface 214 and the second rotational support surface 224 may include curved surfaces corresponding to curved surfaces included in the hinge cover 265.

In an embodiment, when the electronic device 200 is in the unfolded state (e.g., the state in FIG. 2A), the first rotational support surface 214 and the second rotational support surface 224 may cover the hinge cover 265 such that the hinge cover 265 is not exposed on the rear surface of the electronic device 200 or is minimally exposed on the rear surface of the electronic device 200. In an embodiment, when the electronic device 200 is in the folded state (e.g., the state in FIG. 2B), the first rotational support surface 214 and the second rotational support surface 224 may rotate along the curved surfaces included in the hinger cover 265 such that the hinge cover 265 is exposed on the rear surface of the electronic device 200.

Figure 4A:
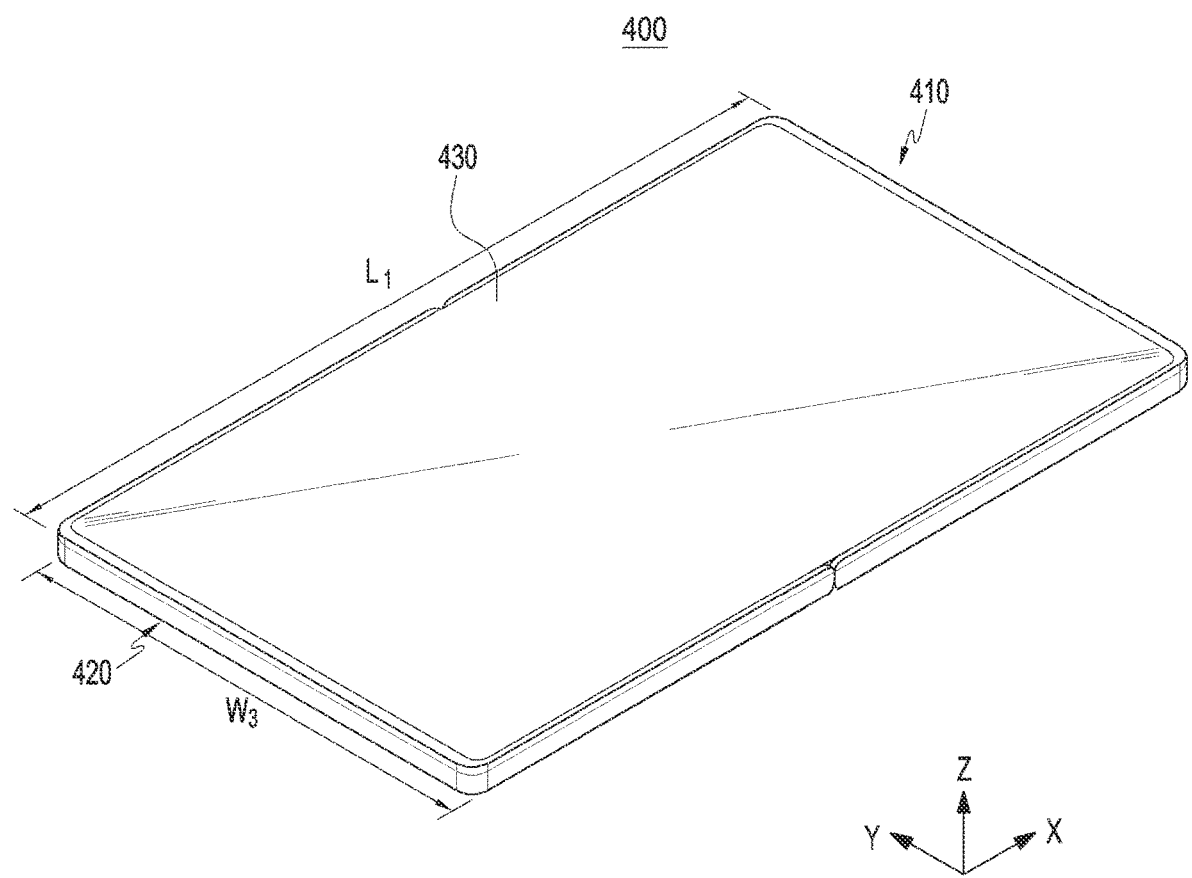
FIG. 4A is a perspective view illustrating the unfolded state of an electronic device according to an embodiment of the disclosure.
Figure 4B:
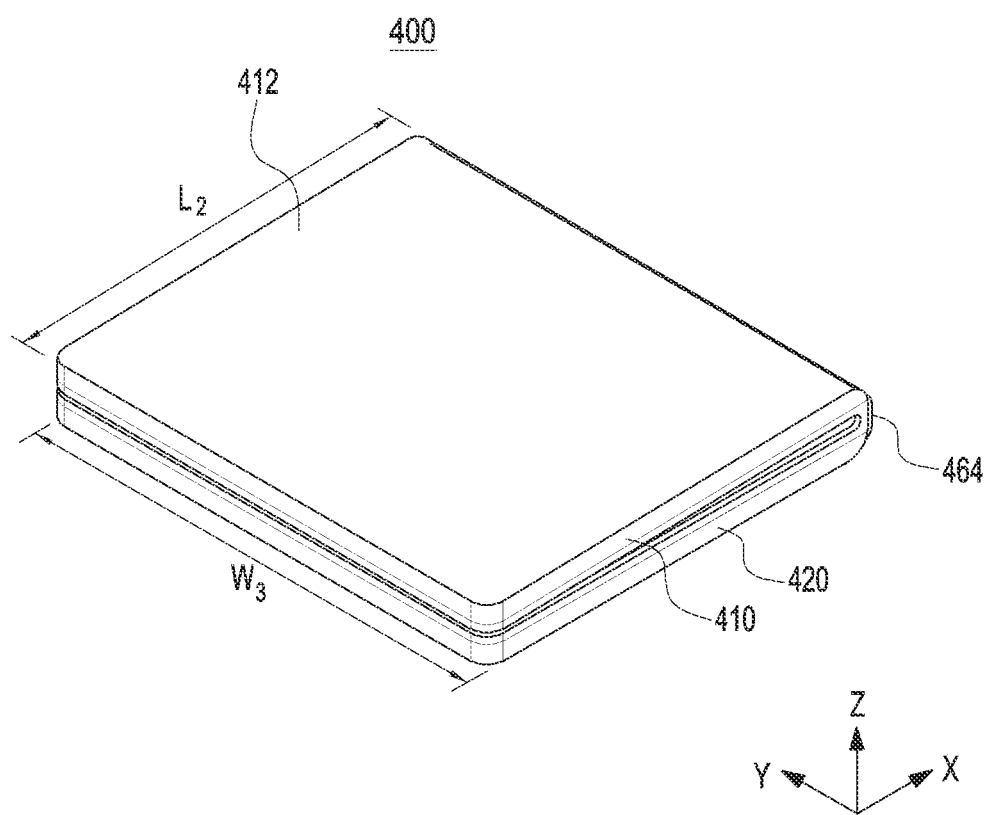
FIG. 4B is a perspective view illustrating the folded state of the electronic device according to an embodiment of the disclosure.

FIG. 4A is a perspective view illustrating the unfolded state of an electronic device 400 (e.g., the electronic device 101 in FIG. 1) according to an embodiment of the disclosure. FIG. 4B is a perspective view illustrating the folded state of the electronic device 400 according to an embodiment of the disclosure.

Referring to FIG. 4A, the electronic device 400 (e.g., the electronic device 101 in FIG. 1) may include a display 430 arranged in a space defined by a pair of housing structures 410 and 420 and a pair of housing structures 410 and 420. Here, the space defined by the pair of housing structures 410 and 420 may be a space to be formed on the surfaces of the pair of housing structures when the pair of housing structures 410 and 420 are located close to each other (the folded state) or away from each other (the unfolded state). The shape of the display 430 may be variable according to the folded or the unfolded state of the pair of housing structures 410 and 420. The display 430 may correspond to a flexible display. According to various embodiments, the display 430 may be manufactured as a touch screen display that enables capacitive or pressure-sensitive touch input thereon so as to receive a user's command in a touch manner.

As illustrated in FIG. 4A, the display 430 may be disposed to occupy most of the space provided by the pair of housing structures 410 and 420 of the electronic device 400. The display 430 may cover not only the front surface of the first housing structure 410, but also the front surface of the second housing structure 420, and may also cover the portion between the front surface of the first housing structure 410 and the front surface of the second housing structure 420 (e.g., the folding area 231c in FIG. 2A).

The horizontal length L1 and the vertical length W3 of the display 430 may be variously set, and according to an embodiment, the display 430 may be manufactured in the size of a pocket wallet such that the electronic device 400 can be easily inserted into a user's pocket when it is folded. The aspect ratio (a horizontal to vertical ratio) may also be designed in various ways. For example, the display may be manufactured in a 35 mm film frame aspect ratio of 2.37:1 or in a television aspect ratio of 4:3, 1.33:1, or 16:9. In addition, the display may be designed in a variety of other aspect ratios.

According to an embodiment, when the pair of housing structures 410 and 420 are folded, the screen of the display 430 may be hidden. Referring to FIG. 4B, in the state in which the pair of housing structures 410 and 420 are completely folded, the screen of the display 430 may be completely hidden by the housing structure. For example, in the folded state illustrated in FIG. 4B, the second surface 412 is positioned on the front surface of the electronic device 400, and the display disposed on the front surface of the first housing structure 410 and the display disposed on the front surface of the second housing structure 420 may face each other.

According to an embodiment, as in the embodiment illustrated in FIG. 4A, the hinge structure 464 is hidden inside the electronic device 400 in a state. Unlike this, as in the embodiment illustrated in FIG. 4B, the hinge structure 464 may be exposed to the outside of the electronic device 400 in another state.

As illustrated in FIGS. 4A and 4B, when the pair of housing structures 410 and 420 are folded, the display 430 may also be folded. When the pair of housing structures 410 and 420 are in the unfolded state, the display 430 may also be unfolded.

The folded and unfolded states of the display 430 will be described in detail with reference to FIGS. 5A and 5B and the subsequent drawings.

Figure 5A:
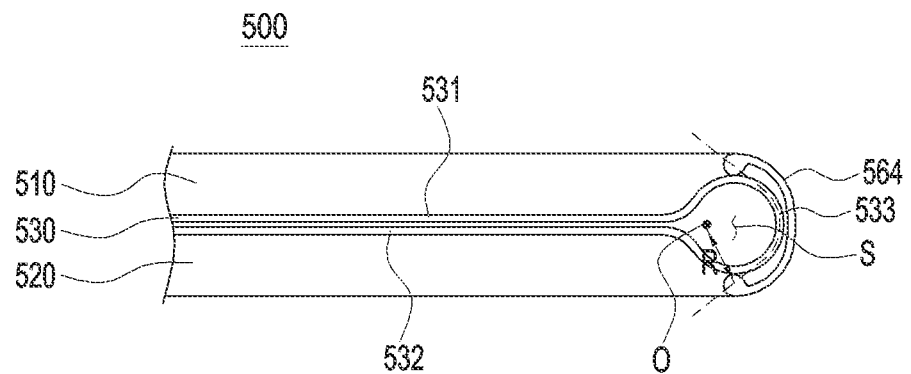
FIG. 5A is a view illustrating the folded state of an electronic device according to an embodiment.
Figure 5B:
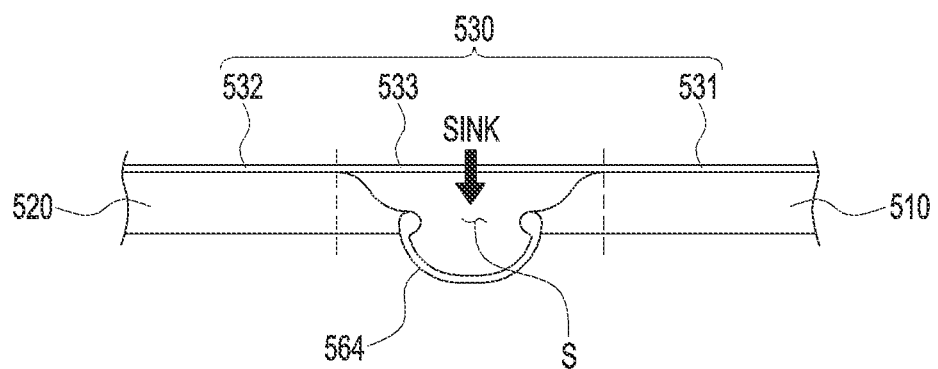
FIG. 5B is a view illustrating the unfolded state of the electronic device according to an embodiment.

FIG. 5A is a view illustrating the folded state of an electronic device 500 according to an embodiment, and FIG. 5B is a view illustrating the unfolded state of the electronic device 500 according to an embodiment.

Referring to FIGS. 5A and 5B together, when a pair of housing structures 510 and 520 are folded to each other, the display 530 is also folded such that a first portion 531 disposed on the first housing structure 510 and a second portion 532 disposed on the housing structure 520 may have shapes substantially facing each other. The third portion 533 may be a portion located between the first portion 531 and the second portion 532 when the display 530 is unfolded. When the display 530 is unfolded to a flat angle (180 degrees), the third portion 533 may be unfolded to be flat so as to form one plane with the first portion 531 and the second portion 532.

As in the embodiment illustrated in FIG. 5A, the third portion 533, which is a folded portion of the display 530, is folded while being bent at a predetermined curvature R. When the curvature R is not properly adjusted, a bending force equal to or greater than allowable stress may be applied to the display 530, which may result in permanent deformation (e.g., bending) or breakage of the display 530. According to an embodiment, as illustrated in FIG. 5A, in the electronic device 500, a space S may be provided using a hinge structure 565 having a predetermined shape such that the third portion 533 of the display 530 is capable of having an appropriate curvature R even when the electronic device 500 is folded.

However, as illustrated in FIG. 5B, in an electronic device including a hinge structure 564 having a predetermined shape, even when the display 530 is unfolded, a space S is formed on the rear surface of the third portion 533 of the display 530, which makes it difficult to maintain flatness, which may cause restrictions in usability as a mobile device.

An embodiment of an electronic device 600 according to various embodiments of the disclosure may be described centering on a hinge structure 664 for solving this problem.

Figure 6A:
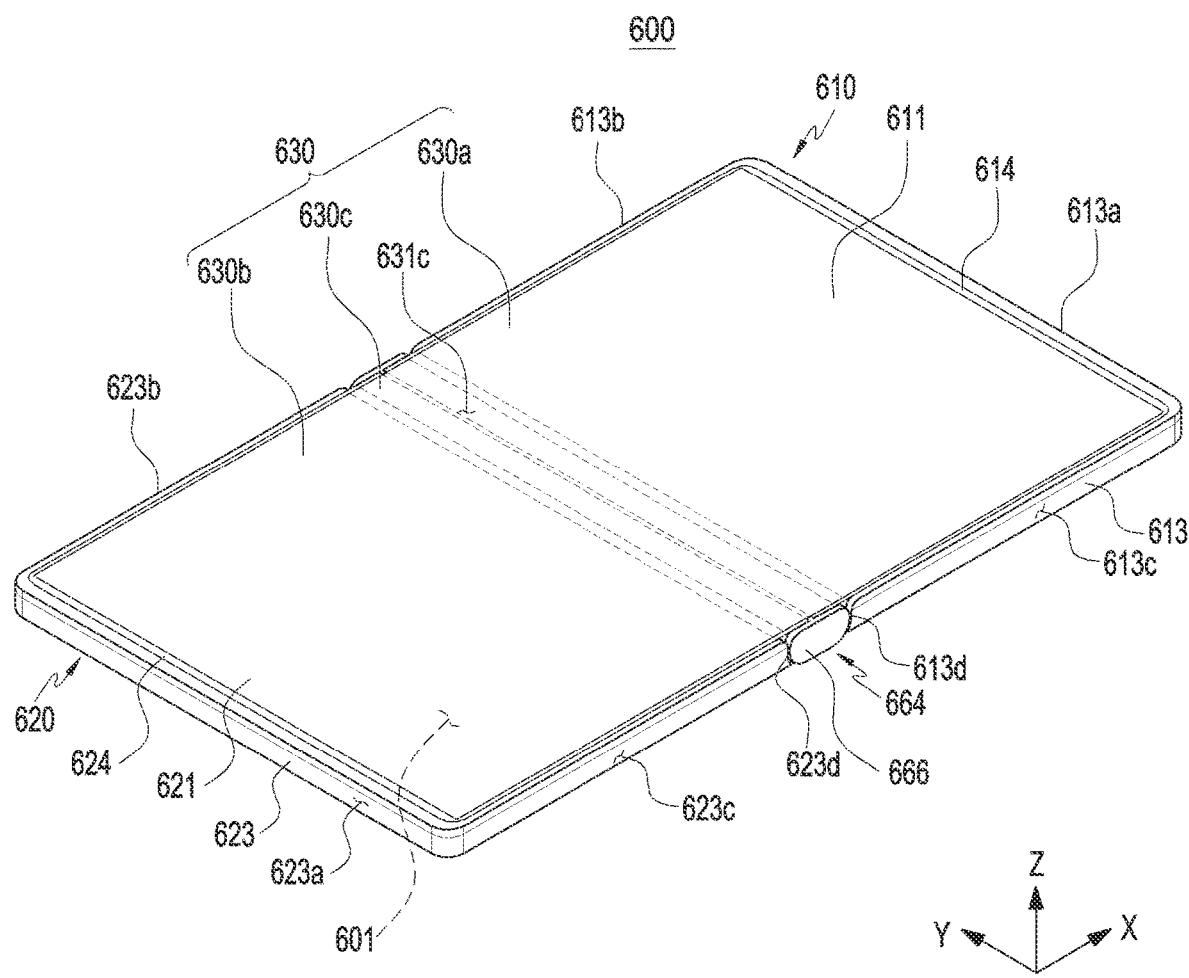
FIG. 6A is a perspective view illustrating the unfolded state of an electronic device according to various embodiments of the disclosure.
Figure 6B:
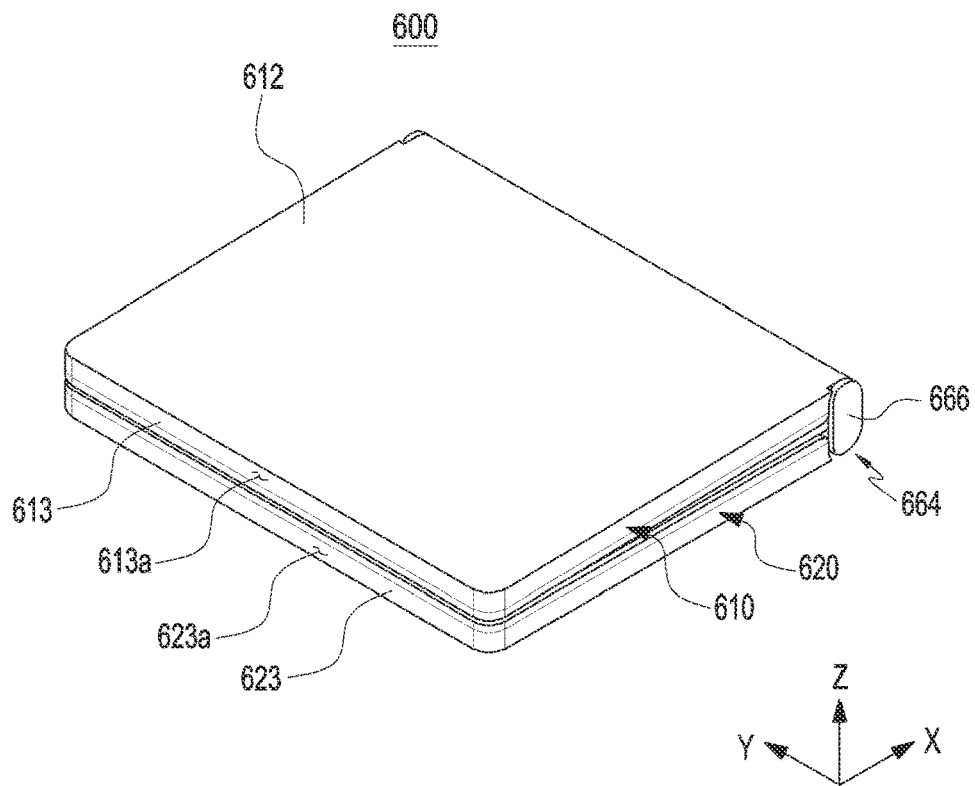
FIG. 6B is a perspective view illustrating the folded state of the electronic device according to various embodiments of the disclosure.
Figure 6C:
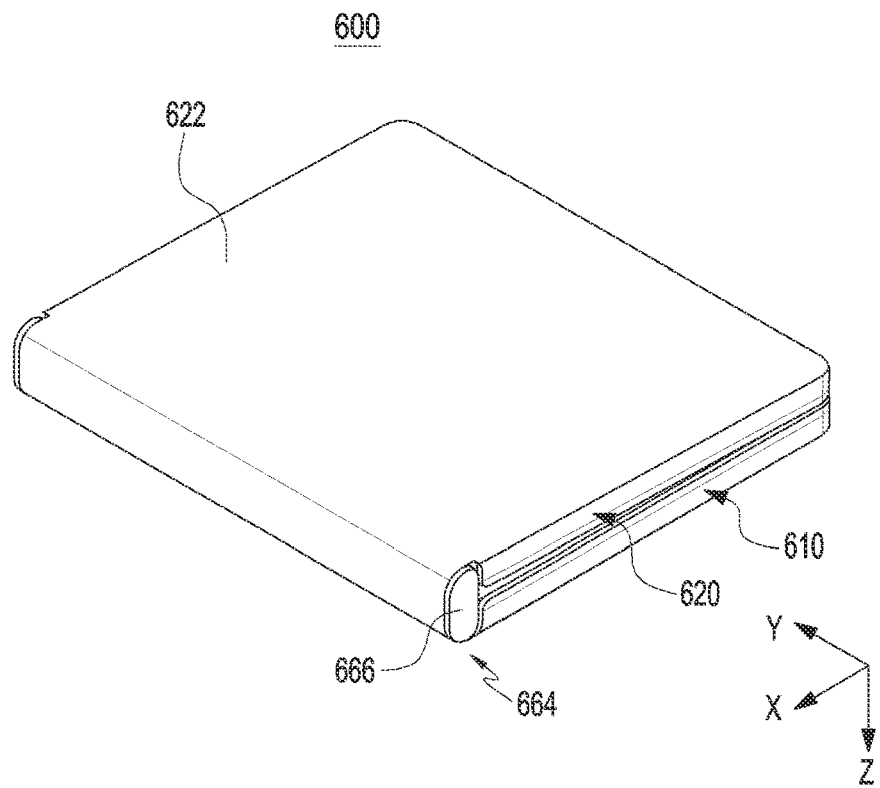
FIG. 6C is a perspective view illustrating the opposite side of the electronic device of FIG. 6B.

FIG. 6A is a perspective view illustrating the unfolded state of an electronic device 600 (e.g., the electronic device 101 in FIG. 1) according to various embodiments of the disclosure. FIG. 6B is a perspective view illustrating the folded state of the electronic device 600 according to various embodiments of the disclosure. FIG. 6C is a perspective view illustrating the opposite side of the electronic device 600 of FIG. 6B.

The electronic device of FIGS. 6A to 6C may be at least partially similar to the electronic device 400 of FIGS. 4A and 4B, or may further include other embodiments of the electronic device 400. The electronic device 600 of FIGS.

6A to 6C may be different from the electronic device 400 of FIGS. 4A and 4B mainly in terms of the hinge structure 664. Hereinafter, in describing the electronic device 600 with reference to FIGS. 6A to 6C, descriptions will be made based on an embodiment different from that of FIGS. 4A and 4B, and redundant descriptions may be omitted.

Referring to FIG. 6A, the electronic device 600 (e.g., the electronic device 101 in FIG. 1) may include a pair of housing structures 610 and 620 rotatably coupled to each other via a hinge structure 664 so as to be folded relative to each other, a cover member 666 configured to cover the foldable portions of the pair of housing structures 610 and 620, and a flexible display 630 arranged in a space defined by the pair of housing structures 610 and 620.

According to an embodiment, the first housing structure 610 and the second housing structure 620 may be disposed on opposite sides about a folding axis (the axis A), and may have generally symmetrical shapes with respect to the folding axis (the axis A). According to an embodiment, the angle or distance between the first housing structure 610 and the second housing structure 620 may vary depending on whether the electronic device 600 is in the unfolded state (the flat state), in the folded state (the closed state), or in the intermediate state. Although a sensor arrangement area in which various sensors are arranged is not separately illustrated in the first housing structure 610 and the second housing structure 620, according to various embodiments, a sensor arrangement area (e.g., 231d in FIG. 2A) in which various sensors are arranged may be set as in the first housing structure 210 and the second the second housing structure 220 illustrated in FIG. 2A. Additionally or alternatively, according to various embodiments, the sensors may be installed in the lower portion of a display mounting space 601, and may be exposed to the outside through open portions 614 and 624 of the mounting space 601.

Referring to FIGS. 6A and 6B together, the first housing structure 610 may include a first surface 611, a second surface 612 facing in a direction opposite to the first surface 611, and a first side member 613 surrounding at least part of the space between the first surface 611 and the second surface 612. When viewed from above the first surface 611, the first side member 613 may include, in the periphery thereof, a first side surface 613a, a second side surface 613b, and a third side surface 613c, and may include, in the periphery thereof, a first rotational support portion 613d. Here, the first rotational support portion 613d may be a portion facing the hinge structure 664. According to an embodiment, the first rotational support portion 613d may be a portion corresponding to the first rotational support surface 214 described above with reference to FIG. 3.

Referring to FIGS. 6A and 6C together, the second housing structure 620 may include a third surface 621, a fourth surface 622 facing in a direction opposite to the third surface 621, and a second side member 623 surrounding at least part of the space between the third surface 621 and the fourth surface 622. When viewed from above the third surface 621, the second side member 623 may include a fourth side surface 623a, a fifth side surface 623b, and a six side surface 623c, and may include a first rotational support portion 623d. Here, the second rotational support portion 623d may be a portion facing the hinge structure 664 and facing the first rotational support portion 613d. According to an embodiment, the second rotational support portion 623d may be a portion corresponding to the second rotational support surface 224 described above with reference to FIG. 3.

In an embodiment, the electronic device 600 may include a mounting space 601 configured to accommodate the display 630 through a structural shape combination of the first housing structure 610 and the second housing structure 620.

According to the embodiments illustrated in FIGS. 6A to 6C, the display 630 is a flexible display, and may include a first portion 630a disposed on the first surface 611 of the first housing structure 610, a second portion 630b disposed on the third surface 621 of the second housing structure 620, and a third portion located between the first portion 630a and the second portion 630b and capable of being bent depending on the angle between the first surface 611 and the second surface 612.

In the embodiment of FIGS. 6A to 6C, the mounting space 601 may have a size slightly larger than that of the display 630. The mounting space 601 may be a portion corresponding to the recess 201 illustrated in FIGS. 2A and 2B. However, the mounting space 601 may be different from the recess 201 illustrated in FIGS. 2A and 2B in that a space (e.g., 665 in FIG. 7) in which the flexible display 630 is capable of being bent is provided in a hinge structure 664 located in a folding area 631c.

Figure 7:
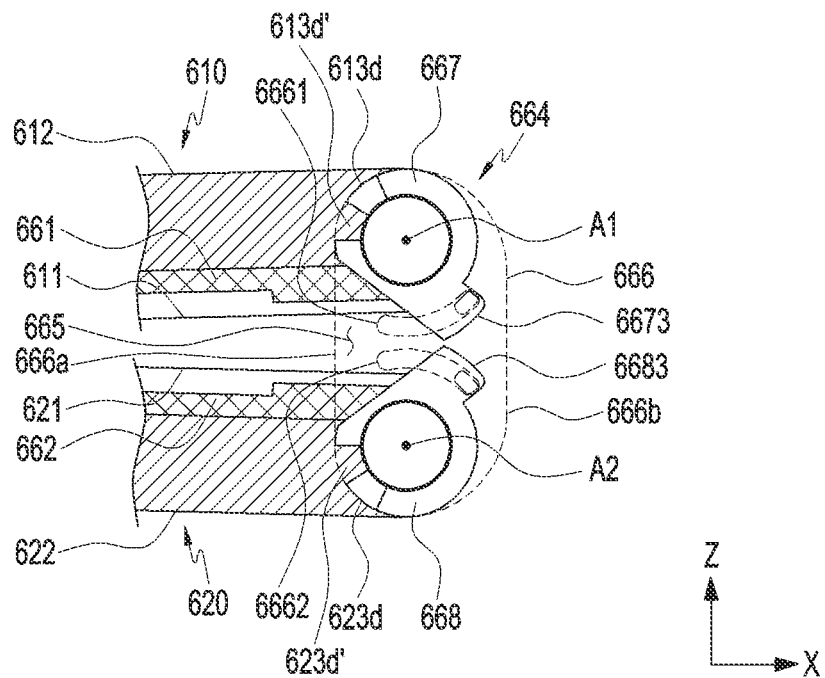
FIG. 7 is a view illustrating the coupled state of a hinge structure, a first housing structure, and a second housing structure when an electronic device according to various embodiments of the disclosure is in the folded state.

FIG. 7 is a view illustrating the folded state of the hinge structure 664, the first housing structure 610, and the second housing structure 620 according to various embodiments of the disclosure.

The hinge structure 664 may include a cover member 666, a first connecting member 667, and a second connecting member 668. The first connecting member 667 and the second connecting member 668 are configured to move independently or dependently from each other, and are located inside the hinge structure 664. The cover member 666 may have a shape surrounding the first and second connecting members 667 and 668.

The hinge structure 664 may be connected to each of the first rotational support portion 613d of the first housing structure 610 and the second rotational support portion 623d of the second housing structure 620. According to an embodiment, the first rotational support portion 613d may be connected to the first connecting member 667, and the second rotational support portion 623d may be connected to the second connecting member 668. Therefore, the first connecting member 667 may be moved dependently according to the movement of the first rotational support portion 613d, and the second connecting member 668 may be moved dependently according to the movement of the second rotational support portion 623d.

As illustrated in FIG. 7, when the electronic device (e.g., 600 in FIG. 6A) is in the folded state, the first surface (e.g., 611 in FIG. 6A) of the first housing structure 610 and the third surface (e.g., 621 in FIG. 6A) of the second housing structure 620 may face each other. Here, the first and third surfaces are not parallel to each other, but may face each other in an inclined form. Although not illustrated in the drawing, the first portion (e.g., 630a in FIG. 6A) of the display disposed on the first surface (e.g., 611 in FIG. 6A) of the first housing structure 610 and the second portion (e.g., 630b in FIG. 6A) of the display disposed on the second surface (e.g., 621 in FIG. 6A) of the second housing structure 620 may also face each other. The first portion (e.g., 630a in FIG. 6A) of the display and the second portion (e.g., 630b in FIG. 6A) of the display are not parallel to each other, and may face each other in an inclined form. The angle between the first surface and the third surface determines the angle between the first portion (e.g., 630a in FIG. 6A) of the display and the second portion (e.g., 630b in FIG. 6A) of the display. Therefore, the magnitude of stress acting on the third portion (e.g., 630c in FIG. 6A) of the display may be determined depending on the angle between the first surface and the third surface. The magnitude of stress acting on the third portion (e.g., 630c in FIG. 6A) of the display is determined by the curvature R of the third portion (e.g., 630c in FIG. 6A), and it is possible to reduce the stress by increasing the curvature R. However, in such a case, the size of the electronic device (e.g., 600 in FIG. 6A) becomes excessively large, and thus it may be difficult to achieve compactness of the electronic device (e.g., 600 in FIG. 6A).

The electronic device (e.g., 600 in FIG. 6A) according to various embodiments disclosed herein may include, in the hinge structure 634, means for maintaining the magnitude of stress acting on the third portion (e.g., 630c in FIG. 6A) of the display within an allowable limit. For example, as the means, the hinge structure 634 may form a recess 665 configured to accommodate at least part of the third portion 630c of the display when the angle between the first surface 611 and the third surface 621 is equal to or less than a predetermined first angle.

The recess 665 illustrated in FIG. 7 may be a portion formed in the hinge structure 664, unlike the recess 201 illustrated in FIGS. 2A and 2B. The recess 665 may be opened when the electronic device 600 is in the folded state, and may accommodate the third portion (e.g., 630c in FIG. 6A) of the display (e.g., 630 in FIG. 6A). According to an embodiment, the recess 665 is a portion defined by the first connecting member 667 and the second connecting member 668, and may be the space surrounded by the first connecting member 667 and the second connecting member 668 in the hinge structure 664.

Figure 8:
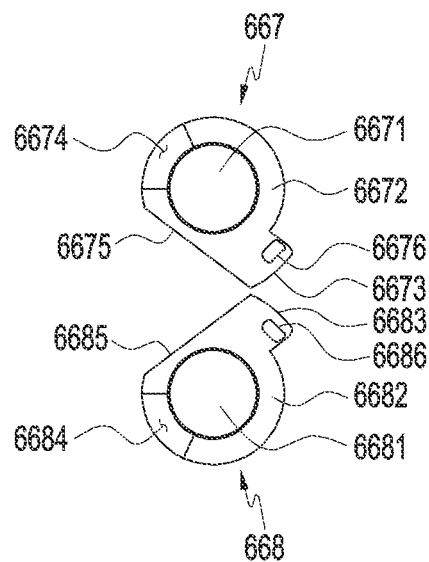
FIG. 8 is a view illustrating a first connecting member and a second connecting member according to various embodiments of the disclosure.
Figure 9:
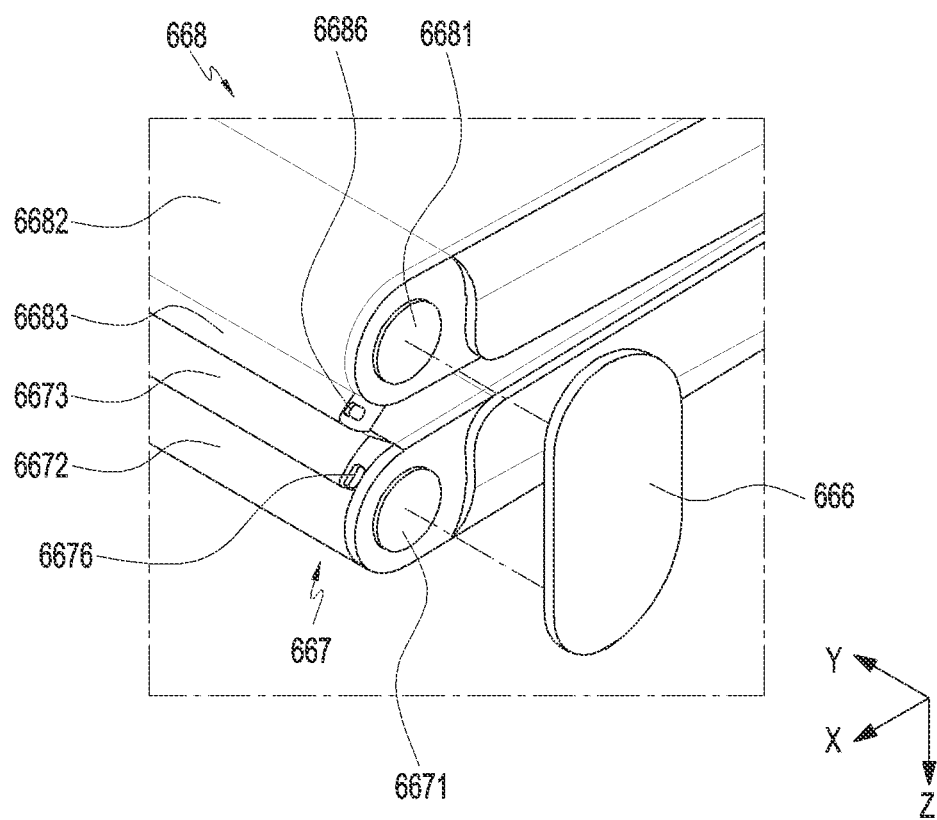
FIG. 9 is a perspective view illustrating the state in which a first connecting member, a second connecting member, and a cover member according to various embodiments of the disclosure are separated.

FIG. 8 is a view illustrating a first connecting member 667 and a second connecting member 668 according to various embodiments of the disclosure. FIG. 9 is a perspective view illustrating the state in which the first connecting member 667, the second connecting member 668, and the cover member 666 according to various embodiments of the disclosure are separated.

The first connecting member 667 and the second connecting member 668 are arranged in the hinge structure 665, and may be configured to move independently or dependently with respect to each other. For example, the dependent movement between the first connecting member 667 and the second connecting member 668 is not separately illustrated in the drawing, but may be implemented using a mechanical structure that directly connects both the connecting members (e.g., a separate link structure that directly connects the first connecting member 667 and the second connecting member 667 to each other) or magnetic bodies (not illustrated) (e.g., magnetic bodies included in the first connecting member 667 and the second connecting member 668, respectively).

The first connecting member 667 and the second connecting member 668 may be obtained by arranging two substantially identical components symmetrically with respect to the folding axis (e.g., A in FIG. 2A) of the hinge structure 664.

Referring to FIG. 8, according to various embodiments, the first connecting member 667 may include a first hinge axis 6671, a first body 6672 surrounding the first hinge axis 6671, a first protrusion 6673 protruding from one side of the first body 6672, and a first stopper 6674 provided on the other side of the first body 6672. In addition, the second connecting member 668 may include a second hinge axis 6681, a second body 6682 surrounding the second hinge axis 6681, a second protrusion 6683 protruding from one side of the second body 6682, and a second stopper 6684 provided on the other side of the second body 6682.

The electronic device (e.g., 600 of FIG. 6A) may be provided with a pair of hinge axes A1 and A2 extending parallel to each other via the first connecting member 667 and the second connecting member 668.

The first body 6672 may surround the circumference of the first hinge shaft 6671, and the first body 6672 may extend along the longitudinal direction of the first hinge shaft 6671. The second body 6682 may surround the circumference of the second hinge shaft 6681, and the second body 6682 may extend along the longitudinal direction of the second hinge shaft 6681. According to an embodiment, at least part of the exterior of the first body 6672 and at least part of the exterior of the second body 6682 may have smooth shapes so as to minimize friction with the first rotational support portion 213d and the second rotational support portion 223d, respectively. According to an embodiment, each of the first body 6672 and the second body 6682 may generally have a circular shape.

The first protrusion 6673 and the second protrusion 6683 may be configured to be connected to the cover member 666. The first protrusion 6673 and the second protrusion 6683 may protrude from one sides from the first body 6672 and the second body 6682, respectively. The first protrusion 6673 and the second protrusion 6683 may protrude toward portions other than the portions connected to the first housing structure 610 and the second housing structure 620, and may protrude substantially toward the center of the hinge structure 664.

The first stopper 6674 and the second stopper 6684 may be provided at the portions connected to the first housing structure 610 and the second housing structure 620. The first stopper 6674 and the second stopper 6684 may be provided on sides substantially opposite to the first protrusion 6673 and the second protrusion 6683, respectively. The first stopper 6674 and the second stopper 6684 may serve to cause the connecting member 667 and the second connecting member 668 in cooperation of the movement of the first housing structure 610 and the second housing structure 620 within a predetermined movable range (or an angular range).

According to the embodiment illustrated in FIG. 7, the first stopper 6674 and the second stopper 6684 may have groove shapes recessed into the first body 6672 and the second body 6682, respectively. According to an embodiment, in the range of a predetermined angle or more, the first rotational support portion 613d of the first housing structure 610 may be engaged with the first stopper 6674 so as to cause the first housing structure 610 and the first connecting member 667 to move together. According to an embodiment, in the range of a predetermined angle or more, the second rotational support portion 623d of the second housing structure 620 may be engaged with the second stopper 6674 so as to cause the second housing structure 610 and the second connecting member 668 to move together.

According to various embodiments, the first body 6672 and the first protrusion 6673 protruding from the first body 6672 may form a first flat portion 6675 for supporting the third portion 630c of the flexible display. In addition, the second body 6682 and the second protrusion 6683 protruding from the second body 6682 may form a second flat portion 6685 for supporting the third portion 630c of the flexible display. At least part of the first body 6672 and the first protrusion 6673 extending from the first body 6672 may constitute the first flat portion 6675. At least part of the second body 6682 and the second protrusion 6683 extending from the second body 6682 may constitute the second flat portion 6685.

The first flat portion 6675 and the second flat portion 6685 may support the bendable third portion 630c of the flexible display 630 in the upper and lower directions, respectively. According to an embodiment, in various folding operations of an electronic device (e.g., 600 in FIG. 6A), the first flat portion 6675 and the second flat portion 6685 may continuously support the third portion 630c. For example, in the case of using the first flat portion 6675 and the second flat portion 6685, when the electronic device (e.g., 600 in FIG. 6A) is folded, the first flat portion 6675 and the second flat portion 6685 may serve to accommodate and support the third portion 630c of the display bent in a predetermined curvature through the recess 665, and when the electronic device (e.g., 600 in FIG. 6A) is unfolded, the first flat portion 6675 and the second flat portion 6685 may serve to firmly support the third portion 630c of the display such that the third portion 630c is flat without moving.

Referring to FIGS. 7 and 8 together, a first support member 661 (e.g., 261 in FIG. 3) and a second support member 662 (e.g., 262 in FIG. 3) for supporting the flexible display 710 may be included inside the first housing structure 610 and the second housing structure 620, respectively. In addition, when the electronic device (e.g., 600 in FIG. 6A) is unfolded such that the first surface 611 and the third surface 621 face substantially the same direction (e.g., Z in FIG. 6A), the first flat portion 6675 and the second flat portion 6685 may form flat surfaces with the first support member 661 and the second support member 662, respectively.

FIG. 9 is a perspective view illustrating the state in which the first connecting member 667, the second connecting member 668, and the cover member 666 according to various embodiments of the disclosure are separated.

Referring to FIG. 9, it is illustrated that the cover member 666 is formed to cover one surface of the first connecting member 667 and one surface of the second connecting member 668. However, the disclosure is not necessarily limited thereto, and, as in the embodiment described above with reference to FIG. 6C, the cover member 666 may include a portion covering the other surface of the first connecting member 667 and the other surface of the second connecting member 668.

According to various embodiments, the first protrusion 6673 and the second protrusion 6683 protruding from the first connecting member 667 and the second connecting member 668 may be configured to come into direct contact with each other. According to an embodiment, the end of the first protrusion 6673 and the end of the second protrusion 6683 come into contact with each other, and when the first connecting member 667 and/or the second connecting member 668 rotate, a slip may occur at the end of the first protrusion 6673 and the end of the second protrusion 6683. Through this structure, the rotation operation of the first connecting member 667 and/or the second connecting member 668 may be performed more stably.

According to various embodiments, each of the first connecting member 667 and the second connecting member 668 may have a shape extending along the hinge axis (e.g., A1 or A2 in FIG. 7). According to an embodiment, each of the first connecting member 667 and the second connecting member 668 may extend in a vertical direction (e.g., a direction parallel to the Y-axis in FIG. 6A) of the electronic device (e.g., 600 in FIG. 6A). However, the disclosure is not necessarily limited thereto, and according to another embodiment, each of the first connecting member 667 and the second connecting member 668 may also take a form that is partially disconnected in a vertical direction (e.g., a direction parallel to the Y axis in FIG. 6A) of the electronic device (e.g., 600 of FIG. 6A). According to still another embodiment, each of the first connecting member 667 and the second connecting member 668 may be divided into two or more members and the divided members may be repeatedly arranged in the vertical direction (e.g., a direction parallel to the Y axis in FIG. 6A) of the electronic device (e.g., 600 in FIG. 6A).

Referring to FIGS. 7 to 9 together, the first connecting member 667 may include a first fastening portion 6676, and the second connecting member 668 may include a second fastening portion 6686. The first fastening portion 6676 on the first protrusion 6673 may be engaged with a first groove 6661 located in the cover member 666. The second fastening portion 6686 on the second protrusion 6683 may be engaged with a second groove 6662 located in the cover member 666.

In addition, the first stopper 6674 may be engaged with a third stopper 613d' disposed on the first rotational support portion 613d of the first housing structure 610, and the second stopper 6684 may be engaged with a fourth stopper 623d' disposed on the second rotational support portion 623d of the second housing structure 620. Here, the first stopper 6664 may have a relatively large volume compared to the third stopper 613d', and the second stopper 6684 may have a relatively larger volume than the fourth stopper 623d'.

Figure 10A:
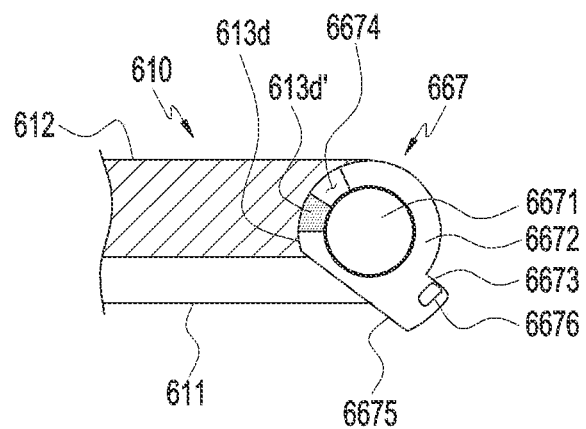
FIG. 10A is a view schematically illustrating the couped state of a first housing structure and a first connecting member in a range equal to or less than a predetermined angle according to various embodiments of the disclosure.
Figure 10B:
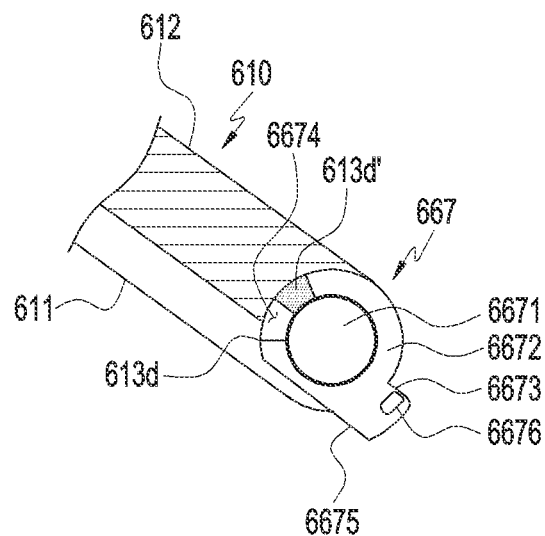
FIG. 10B is a view schematically illustrating the couped state of the first housing structure and the first connecting member in a range exceeding the predetermined angle according to various embodiments of the disclosure.

FIG. 10A is a view schematically illustrating the couped state of the first housing structure 610 and the first connecting member 667 in a range equal to or less than a predetermined angle according to various embodiments of the disclosure. FIG. 10B is a view schematically illustrating the coupled state of the first housing structure 610 and the first connecting member 667 in a range exceeding a predetermined angle according to various embodiments of the disclosure. FIGS. 10A and 10B illustrate only the coupled state of the first housing structure 610 and the first connecting member 667, but the principles of operations thereof are also applicable to the second housing structure 620 and the second connecting member 668.

Referring to FIG. 10A, in an angular range equal to or less than a predetermined first angle between the first surface 611 and the third surface 621, the first stopper 6664 and the second stopper 6684 may be freely engaged with the third stopper 613d' and the fourth stopper 623d', respectively, so that there is no effect on the first connecting member 667 and the second connecting member 668.

According to another embodiment, as illustrated in FIG. 10B, in an angle range exceeding a predetermined first angle between the first surface 611 and the third surface 621, the first stopper 6674 and the second stopper 6684 may be constrained with respect to the third stopper 613d' and the fourth stopper 623d', respectively, and may cause the first fastening portion 6676 and the second fastening portion 6686 to move along the first groove 6661 and the second groove 6662 in the cover member 666, respectively.

Figure 11A:
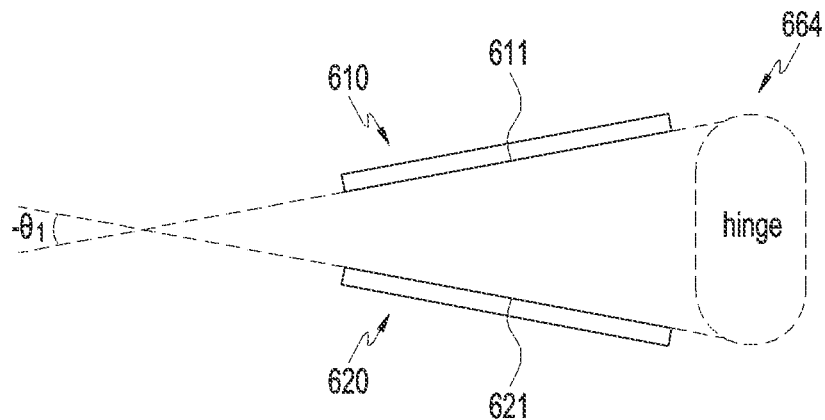
FIGS. 11A and 11B are schematic views each illustrating an angle formed between a first surface and a third surface of an electronic device according to various embodiments of the disclosure.
Figure 11B:
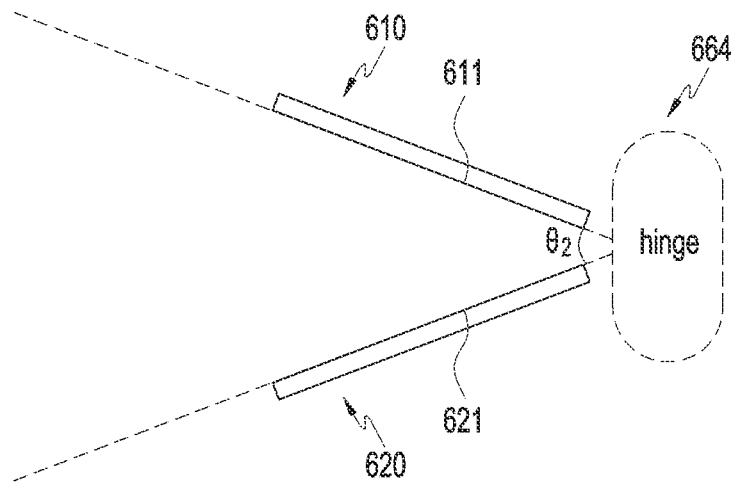

FIGS. 11A and 11B are schematic views each illustrating an angle formed between the first surface 611 and the third surface 621 of the electronic device (e.g., 600 in FIG. 6A) according to various embodiments of the disclosure.

Referring to FIGS. 11A and 11B, the first surface 611 of the first housing structure 610 and the third surface 621 of the second housing structure 620 may form various angles therebetween according to various arrangements thereof.

As illustrated in FIG. 11A, when the hinge structure 664 is disposed on the right side of the first housing structure 610 and the second housing structure 620, the angle between the first surface 611 and the third surface 621 may be a negative angle (−θ1). For example, the first surface 611 and the third surface 621 may be designed to have a gap forming an angle of −7° therebetween when folded to the maximum in order to assure an allowable curvature of the flexible display. Of course, it should be noted that the gap forming the angle of −7° corresponds to an example, and may be set to various other angles.

According to another embodiment, as illustrated in FIG. 11B, the first surface 611 and the third surface 621 may form a positive angle θ2 therebetween. The positive angle θ2 may form a flat angle (e.g., 180°) when the electronic device is unfolded to the maximum. Of course, it should be noted that the positive angle is also an example, and the electronic device may be unfolded to an angle equal to or more than the flat angle within an error range.

Among the various angles of the first surface 611 and the third surface 621 mentioned herein, a predetermined angle (or a first angle) at which the first connecting member 667 and the second connecting member 668 start to rotate may be set in various ways. Hereinafter, the predetermined angle may be set based on, for example, 45°, but is not limited thereto.

Figure 12A:
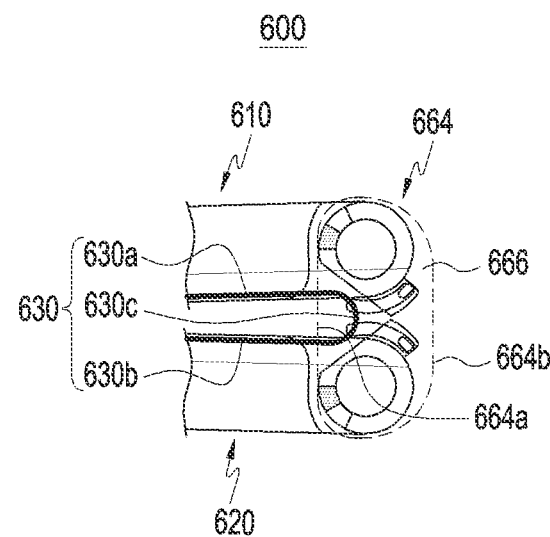
FIGS. 12A, 12B, and 12C are views illustrating respective coupled states of a hinge structure, a first housing structure, and a second housing structure in various operations of an electronic device according to various embodiments of the disclosure.
Figure 12B:
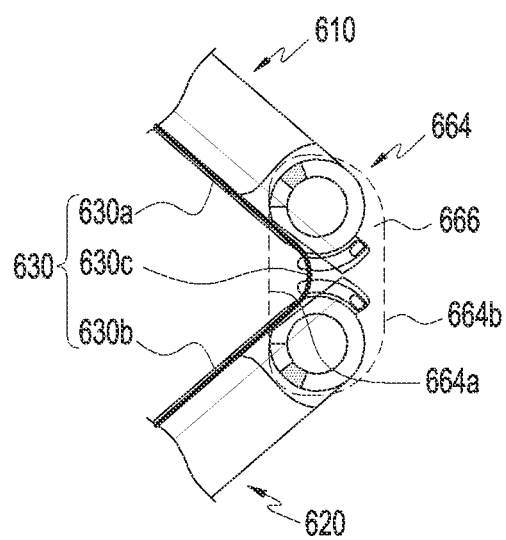
Figure 12C:
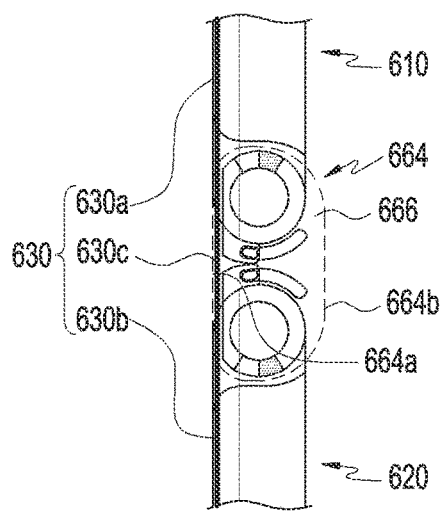

FIGS. 12A, 12B, and 12C are views illustrating respective coupled states of the hinge structure 664, the first housing structure 610, and the second housing structure 620 in various operations of the electronic device 600 according to various embodiments of the disclosure.

To correspond to various angles between the first surface 611 and the third surface 621 illustrated in FIGS. 11A and 11B, the shape of the flexible display 630 may also be variously changed.

According to an embodiment, when the angle formed by the first surface 611 and the third surface 621 is equal to or less than the first angle (e.g., 45°), the first connecting member 667 and the second connecting member 668 may each support the third portion 630c of the flexible display while maintaining the size (or volume) of the recess 665 constant.

According to another embodiment, when the angle formed by the first surface 611 and the third surface 621 gradually increases beyond the first angle (e.g. 45°), each of the first connecting member 667 and the second connecting member 668 may support the third portion 630c of the flexible display while reducing the size (or volume) of the recess 665.

In addition, when the first surface 611 and the third surface 621 are unfolded to the flat angle (e.g., 180°), the first connecting member 667 and the second connecting member 668 may close the recess 665 and may support the third portion 630c of the flexible display.

Figure 13:
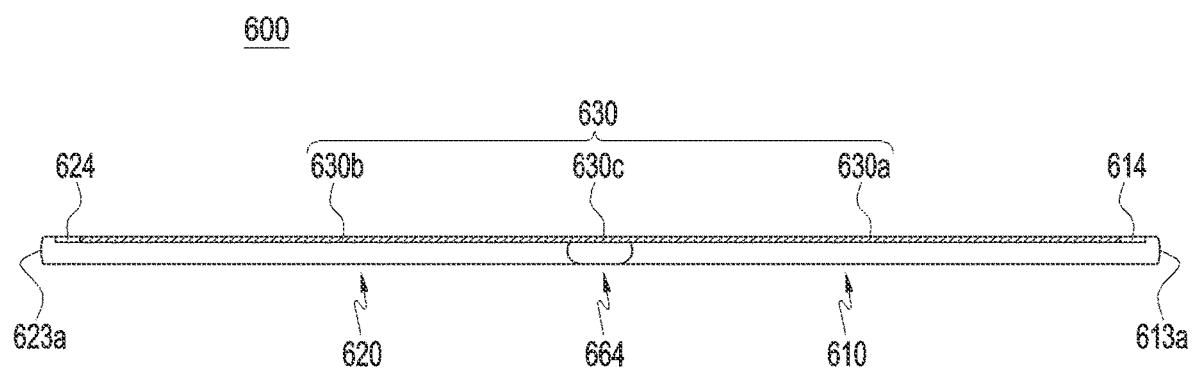
FIG. 13 is a cross-sectional view illustrating the unfolded state of an electronic device according to various embodiments of the disclosure.
Figure 14:
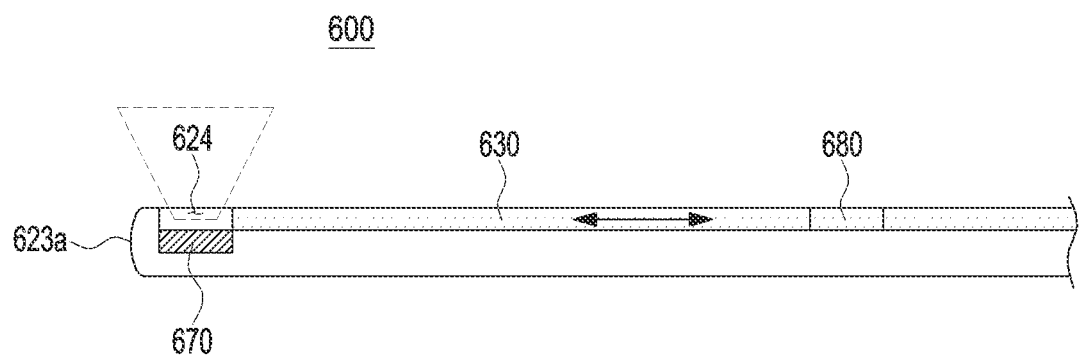
FIG. 14 is a cross-sectional view illustrating the state in which an electronic component (e.g., a camera) is exposed through a partial space when an electronic device according to various embodiments of the disclosure is in the unfolded state.

FIG. 13 is a cross-sectional view illustrating the unfolded state of an electronic device 600 according to various embodiments of the disclosure. FIG. 14 is a cross-sectional view illustrating the state in which a function module is exposed through a partial space when the electronic device 600 according to various embodiments of the disclosure is in the unfolded state.

Referring to FIG. 13, the first housing structure 610 and the second housing structure 620 according to various embodiments define the flexible display mounting space (e.g., 601 in FIG. 6A) on the first surface 611, and at least one electronic component 670 may be included under the mounting space. According to various embodiments, the electronic component 670 may correspond to an optical module (e.g., a camera) or any of various sensor modules (e.g., a proximity/illuminance sensor, a temperature/humidity sensor, a color sensor, a proximity sensor, a fingerprint sensor, an IR sensor, an iris sensor, or other biometric sensors).

According to various embodiments, when the first surface 611 and the third surface 621 are unfolded to face substantially the same direction, the electronic component 670 may be visually recognized to the outside through a portion exposed in the mounting space.

Referring to FIG. 14, the electronic device 600 may further include a tension member 680 configured to maintain a constant tension of the display when the display is unfolded. The tension member 680 may pull the display toward the first side surface of the first housing structure or the fourth side surface of the second housing structure, or toward one of the first side surface and the fourth side surface.

Figure 15A:
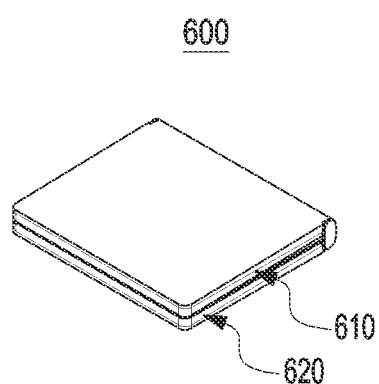
FIGS. 15A, 15B, and 15C are views illustrating respective operations of an electronic device according to various embodiments of the disclosure.
Figure 15B:
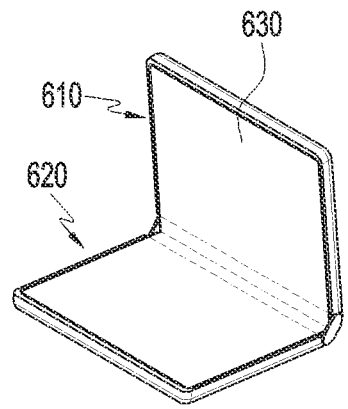
Figure 15C:
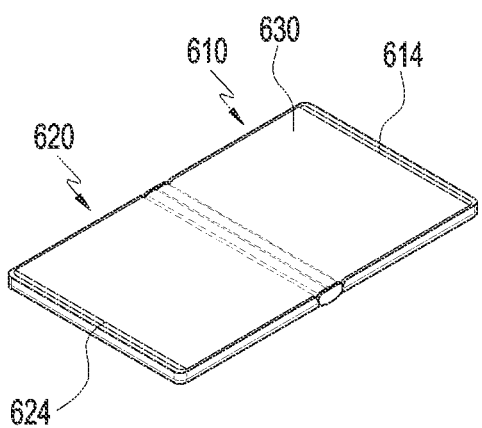

FIGS. 15A, 15B, and 15C are views illustrating respective operations of the electronic device 600 according to various embodiments of the disclosure.

The electronic device 600 according to various embodiments described above with reference to FIGS. 1 to 14 may perform various folding and unfolding operations shown in FIGS. 15A, 15B, and 15C.

According to various embodiments disclosed herein, it is possible to provide a structure capable of reducing stress applied to a flexible display in a foldable electronic device and capable of effectively maintaining the flatness of the flexible display when the electronic device 600 is unfolded.

The electronic device according to various embodiments disclosed herein may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that various embodiments of the disclosure and the terms used therein are not intended to limit the technological features set forth herein to particular embodiments and include various changes, equivalents, and/or alternatives for a corresponding embodiment. With regard to the description of the drawings, similar reference numerals may be used to designate similar or relevant elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

The invention claimed is:

1. An electronic device comprising:
a first housing structure including a first surface, a second surface facing in a direction opposite to the first surface, and a first side member surrounding at least a portion of a space between the first surface and the second surface, wherein the first side member includes a first rotational support portion at an edge thereof when viewed from above the first surface;
a second housing structure including a third surface, a fourth surface facing in a direction opposite to the third surface, and a second side member surrounding at least a portion of a space between the third surface and the fourth surface, wherein the second side member includes a second rotational support portion facing the first rotational support portion at an edge thereof when viewed from above the third surface;
a flexible display including a first portion disposed on the first surface, a second portion disposed on the third surface, and a third portion disposed between the first portion and the second portion and having a shape variable depending on an angle between the first surface and the third surface; and
a hinge structure connected to each of the first rotational support portion and the second rotational support portion, wherein the hinge structure is capable of forming a recess for accommodating at least a portion of the third portion when the angle between the first surface and the third surface is equal to or less than a predetermined first angle,
wherein the hinge structure includes a first connecting member connected to the first rotational support portion, a second connecting member connected to the second rotational support portion, and a cover member,
wherein a pair of hinge shafts, which extend parallel to each other, are provided by the first connecting member and the second connecting member,
wherein the first connecting member includes a first hinge shaft, a first body surrounding a circumference of the first hinge shaft, a first protrusion protruding from one side of the first body, and a first stopper disposed on another side of the first body, and
wherein the second connecting member includes a second hinge shaft, a second body surrounding a circumference of the second hinge shaft, a second protrusion protruding from one side of the second body, and a second stopper disposed on another side of the second body.

2. The electronic device of claim 1,
wherein, when the angle between the first surface and the third surface is equal to or less than the first angle, the first connecting member and the second connecting member each support the third portion of the flexible display while maintaining a size of the recess constant, and
wherein, when the angle between the first surface and the third surface gradually increases beyond the first angle, the first connecting member and the second connecting member each support the third portion of the flexible display while reducing the size of the recess.

3. The electronic device of claim 2, wherein, when the first surface and the third surface is unfolded to a flat angle, the first connecting member and the second connecting member close the recess and support the third portion of the flexible display.

4. The electronic device of claim 1,
wherein the first body and the first protrusion protruding from the first body forms a first flat portion that supports a third portion of the flexible display, and
wherein the second body and the second protrusion protruding from the second body forms a second flat portion that supports the third portion of the flexible display.

5. The electronic device of claim 4, further comprising:
a first support member and a second support member provided inside the first housing structure and the second housing structure, respectively, so as to support the flexible display,
wherein, when the electronic device is unfolded such that the first surface and the third surface face substantially a same direction, the first flat portion and the second flat portion form flat surfaces with the first support member and the second support member, respectively.

6. The electronic device of claim 1,
wherein a first fastening portion, which is provided on the first protrusion, is engaged with a first groove provided in the cover member, and the first stopper is engaged with a third stopper, which is provided in the first rotational support portion of the first housing structure, and
wherein a second fastening portion, which is provided on the second protrusion, is engaged with a second groove provided in the cover member, and the second stopper is engaged with a fourth stopper, which is provided in the second rotational support portion of the second housing structure.

7. The electronic device of claim 6,
wherein the first stopper has a volume larger than a volume of the third stopper, and
wherein the second stopper has a volume larger than a volume of the fourth stopper.

8. The electronic device of claim 6,
wherein, when the angle between the first surface and the third surface is in a range equal to or less than the predetermined first angle, the first stopper and the second stopper are freely engaged with the third stopper and the fourth stopper, respectively, such that there is no effect on the first connecting member and the second connecting member, and
wherein, when the angle between the first surface and the third surface is in a range exceeding the predetermined first angle, the first stopper and the second stopper are constrained with respect to the third stopper and the fourth stopper, respectively, and cause the first fastening portion and the second fastening portion to move along the first groove and the second groove, respectively.

9. The electronic device of claim 1, wherein the first housing structure and the second housing structure define a flexible display mounting space in the first surface, and at least one electronic component is included in a lower portion of the mounting space.

10. The electronic device of claim 9, wherein, when the first surface and the second surface are unfolded to face substantially a same direction, the electronic component is visible to an outside through a portion exposed from the mounting space.

11. The electronic device of claim 9, wherein the electronic component is an optical module.

12. The electronic device of claim 1, further comprising:
a tension member configured to maintain a tension of the display constant when the display is unfolded.

13. The electronic device of claim 12, wherein the tension member pulls the display toward the first surface of the first housing structure or the fourth surface of the second housing structure, or toward one of the first surface and the fourth surface.

* * * * *